US010917262B2

(12) United States Patent
Gao et al.

(10) Patent No.: US 10,917,262 B2
(45) Date of Patent: Feb. 9, 2021

(54) VXLAN PACKET FORWARDING METHOD, DEVICE, AND SYSTEM

(71) Applicant: Huawei Technologies Co., Ltd., Shenzhen (CN)

(72) Inventors: Yuan Gao, Nanjing (CN); Wenhui Li, Nanjing (CN); Shenyu Ding, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/358,191

(22) Filed: Mar. 19, 2019

(65) Prior Publication Data
US 2019/0215190 A1 Jul. 11, 2019

Related U.S. Application Data

(63) Continuation of application No. PCT/CN2017/093887, filed on Jul. 21, 2017.

(30) Foreign Application Priority Data

Sep. 20, 2016 (CN) .......................... 2016 1 0836569

(51) Int. Cl.
*H04L 12/46* (2006.01)
*H04L 12/707* (2013.01)
(Continued)

(52) U.S. Cl.
CPC ...... *H04L 12/4675* (2013.01); *H04L 12/4633* (2013.01); *H04L 12/4641* (2013.01);
(Continued)

(58) Field of Classification Search
CPC ..... H04L 45/22; H04L 45/28; H04L 12/4675; H04L 61/103; H04L 45/302; H04L 12/4641; H04L 12/4633; H04L 47/125
See application file for complete search history.

(56) References Cited

U.S. PATENT DOCUMENTS 10,050,855 B1 * 8/2018 Singh .................... H04L 67/145
2015/0058470 A1 2/2015 Duda
(Continued)

FOREIGN PATENT DOCUMENTS

| CN | 104270298 A | 1/2015 |
|---|---|---|
| CN | 104660508 A | 5/2015 |

(Continued)

OTHER PUBLICATIONS

Foreign Communication From A Counterpart Application, Chinese Application No. 201610836569.0, Chinese Office Action dated Jun. 4, 2019, 9 pages.

(Continued)

*Primary Examiner* — Peter P Chau
(74) *Attorney, Agent, or Firm* — Conley Rose, P.C.

(57) ABSTRACT

A virtual extensible local area network (VXLAN) packet forwarding method, device, and system, where the method includes setting, by a local VXLAN tunnel end point (VTEP) device based on a priority of a VXLAN tunnel, tunnel states of at least two VXLAN tunnels coupled to the local VTEP device, sending the tunnel states of the VXLAN tunnels to at least two peer VTEP devices, where the at least two VXLAN tunnels are in a one-to-one correspondence with the at least two peer VTEP devices, and separately confirming, by the at least two peer VTEP devices, the received tunnel states of the VXLAN tunnels. A VXLAN tunnel in an active state is in a working state, and a VXLAN tunnel in an inactive state is in a non-working state, thereby improving a redundancy protection capability of a VXLAN network.

18 Claims, 12 Drawing Sheets

(51) Int. Cl.
  *H04L 12/703* (2013.01)
  *H04L 12/725* (2013.01)
  *H04L 29/12* (2006.01)
  *H04L 12/803* (2013.01)

(52) U.S. Cl.
  CPC .............. *H04L 45/22* (2013.01); *H04L 45/28* (2013.01); *H04L 45/302* (2013.01); *H04L 61/103* (2013.01); *H04L 47/125* (2013.01)

(56) References Cited

U.S. PATENT DOCUMENTS

| | | | |
|---|---|---|---|
| 2015/0229724 A1* | 8/2015 | Ray | H04L 45/026 370/352 |
| 2015/0281042 A1 | 10/2015 | Agarwal et al. | |
| 2015/0281048 A1 | 10/2015 | Agarwal et al. | |
| 2015/0281067 A1* | 10/2015 | Wu | G06F 9/455 370/392 |
| 2016/0211989 A1* | 7/2016 | Jain | H04L 41/06 |
| 2016/0269284 A1 | 9/2016 | Cheng et al. | |
| 2017/0207992 A1 | 7/2017 | Huang et al. | |
| 2017/0317919 A1* | 11/2017 | Fernando | H04L 41/0806 |
| 2019/0068543 A1* | 2/2019 | Zhang | H04L 29/06 |

FOREIGN PATENT DOCUMENTS

| | | |
|---|---|---|
| CN | 105471740 A | 4/2016 |
| CN | 105490957 A | 4/2016 |
| CN | 105577417 A | 5/2016 |
| WO | 2016004874 A1 | 1/2016 |

OTHER PUBLICATIONS

Foreign Communication From A Counterpart Application, European Application No. 17852226.4, Extended European Search Report dated May 14, 2019, 11 pages.

Machine Translation and Abstract of Chinese Publication No. CN104270298, Jan. 7, 2015, 19 pages.

Machine Translation and Abstract of Chinese Publication No. CN105490957, Apr. 13, 2016, 34 pages.

Machine Translation and Abstract of Chinese Publication No. CN105577417, May 11, 2016, 36 pages.

Foreign Communication From A Counterpart Application, PCT Application No. PCT/CN2017/093887, English Translation of International Search Report dated Oct. 18, 2017, 2 pages.

* cited by examiner

VXLAN PACKET FORWARDING METHOD, DEVICE, AND SYSTEM

CROSS-REFERENCE TO RELATED APPLICATIONS

This application is a continuation of International Patent Application No. PCT/CN2017/093887 filed on Jul. 21, 2017, which claims priority to Chinese Patent Application No. 201610836569.0 filed on Sep. 20, 2016. The disclosures of the aforementioned applications are hereby incorporated by reference in their entireties.

TECHNICAL FIELD

This application relates to the field of communications technologies, and in particular, to a virtual extensible local area network (VXLAN) technology.

BACKGROUND

A VXLAN is a technology in which layer 2 packets are encapsulated using a layer 3 protocol. The VXLAN technology relates to packets in a Media Access Control (MAC)-in-User Datagram Protocol (UDP) format. Further, an Ethernet frame based on the MAC protocol is encapsulated in a UDP packet. Further, the UDP packet is encapsulated in an Internet Protocol (IP) packet, and the IP packet may be transmitted in a layer 3 network. Therefore, it is implemented that the Ethernet frame is transmitted in the layer 3 network. In the VXLAN technology, a VXLAN network identifier (VNI) is used to identify a VXLAN network segment. Different VXLAN network segments correspond to different VNIs. Different VXLAN network segments are isolated from each other. Two virtual machines (VMs) in a same VNI may directly communicate with each other. That is, two VMs in a same VNI may communicate with each other without using a VXLAN layer 3 gateway (also referred to as VXLAN L3 Gateway), and two VMs in different VNIs need to communicate with each other using the VXLAN layer 3 gateway. A VNI field includes 24 bits. One management domain may include a maximum of 216 VXLAN network segments.

A VXLAN tunnel end point (VTEP) device is an edge device in the VXLAN. The VTEP device transmits traffic of the VXLAN through a VXLAN tunnel. The VXLAN tunnel is a point-to-point logical tunnel between two VTEP devices.

To improve network reliability, a VXLAN network may use a multi-active gateway. For example, the VTEP device separately communicates with two VXLAN layer 3 gateway devices through the VXLAN tunnel. The two VXLAN layer 3 gateway devices form a load balancing group, which forwards traffic received from the VTEP device to the IP network (for example, a layer 3 virtual private network (L3 VPN)). Gateway interfaces used by the two VXLAN layer 3 gateways to communicate with the VTEP device are configured with a same IP address and a same MAC address, and the two VXLAN layer 3 gateways are configured with a same virtual VTEP IP address. In this way, the VTEP device forms an equal and weighted cost multi-path (ECMP) to the VXLAN layer 3 gateway.

However, in actual application, the multi-active gateway cannot provide a perfect redundancy protection mechanism. In addition, requirements on synchronization and latency are relatively high because of use of a load balancing mode.

SUMMARY

In view of this, embodiments of this application provide a VXLAN packet forwarding method, device, and system in order to improve a redundancy protection capability of a VXLAN network and reduce requirements on synchronization and latency.

Technical solutions provided in the embodiments of this application are as follows.

According to a first aspect, a VXLAN packet forwarding method is provided, and the method includes setting, by a first VTEP device based on a priority of a first VXLAN tunnel, a tunnel state of the first VXLAN tunnel to an active state, where the first VXLAN tunnel is a VXLAN tunnel between the first VTEP device and a second VTEP device, setting, by the first VTEP device based on a priority of a second VXLAN tunnel, a tunnel state of the second VXLAN tunnel to an inactive state, where the second VXLAN tunnel is a VXLAN tunnel between the first VTEP device and a third VTEP device, the priority of the first VXLAN tunnel is higher than the priority of the second VXLAN tunnel, and an IP address of the second VTEP device is different from an IP address of the third VTEP device, notifying, by the first VTEP device through the first VXLAN tunnel, the second VTEP device of first state information carrying an active state, where the first state information is used to indicate the tunnel state of the first VXLAN tunnel, notifying, by the first VTEP device through the second VXLAN tunnel, the third VTEP device of second state information carrying an inactive state, where the second state information is used to indicate the tunnel state of the second VXLAN tunnel, and forwarding, by the first VTEP device, the VXLAN packet through the first VXLAN tunnel in an active tunnel state.

Based on the solution provided in this embodiment, the first VTEP device negotiates the tunnel state with the second VTEP device and the third VTEP device that are used as VXLAN gateways such that the VXLAN tunnel in an active state is in a working state and forwards traffic, and the VXLAN tunnel in an inactive state is in a non-working state and does not forward traffic. A redundancy protection capability of the VXLAN network is improved using the solution provided in this embodiment.

Optionally, before forwarding, by the first VTEP device, the VXLAN packet through the first VXLAN tunnel in an active tunnel state, the method further includes receiving, by the first VTEP device through the first VXLAN tunnel, first reply information for the first state information from the second VTEP device, where the first reply information is used to instruct the second VTEP device to confirm the tunnel state of the first VXLAN tunnel as an active state, and receiving, by the first VTEP device through the second VXLAN tunnel, second reply information for the second state information from the third VTEP device, where the second reply information is used to instruct the third VTEP device to confirm the tunnel state of the second VXLAN tunnel as an inactive state.

In the foregoing implementation, reliability of a forwarding and execution process is effectively improved, and packet loss caused by asynchronization between a setting process and a traffic forwarding process is avoided.

Optionally, after forwarding, by the first VTEP device, the VXLAN packet through the first VXLAN tunnel in an active tunnel state, the method further includes setting, by the first VTEP device, the tunnel state of the first VXLAN tunnel to an inactive state, and setting, by the first VTEP device, the tunnel state of the second VXLAN tunnel to an active state when the first VTEP device determines that a failure occurs in the first VXLAN tunnel, notifying, by the first VTEP device through the second VXLAN tunnel, the third VTEP device of third state information carrying an active state, where the third state information is used to indicate the tunnel state of the second VXLAN tunnel, receiving, by the first VTEP device through the second VXLAN tunnel, third reply information for the third state information from the third VTEP device, where the third reply information is used to instruct the third VTEP device to update the tunnel state of the second VXLAN tunnel to an active state, and forwarding, by the first VTEP device, the VXLAN packet through the second VXLAN tunnel in an active tunnel state.

Optionally, after forwarding, by the first VTEP device, the VXLAN packet through the first VXLAN tunnel in an active tunnel state, the method further includes receiving, by the first VTEP device through the first VXLAN tunnel, a link failure message from the second VTEP device, where the link failure message is used to indicate that a failure occurs in a link between the second VTEP device and an IP network, and the IP network is used to send traffic to a host connected to the first VTEP device and is used to receive traffic from the host connected to the first VTEP device, setting, by the first VTEP device, the tunnel state of the first VXLAN tunnel to an inactive state, and setting, by the first VTEP device, the tunnel state of the second VXLAN tunnel to an active state, notifying, by the first VTEP device through the second VXLAN tunnel, the third VTEP device of third state information carrying an active state, where the third state information is used to indicate the tunnel state of the second VXLAN tunnel, receiving, by the first VTEP device through the second VXLAN tunnel, third reply information for the third state information from the third VTEP device, where the third reply information is used to instruct the third VTEP device to update the tunnel state of the second VXLAN tunnel to an active state, and forwarding, by the first VTEP device, the VXLAN packet through the second VXLAN tunnel in an active tunnel state.

Optionally, the method further includes receiving, by the first VTEP device, an Address Resolution Protocol (ARP) request packet from the host, where the ARP request packet is used to request a MAC address of a VXLAN gateway, and sending, by the first VTEP device respectively through the first VXLAN tunnel and the second VXLAN tunnel, the ARP request packet to the second VTEP device and the third VTEP device such that the second VTEP device and the third VTEP device generate ARP entries based on the ARP request packet.

In the foregoing implementation, ARP entry synchronization and MAC entry synchronization between VXLAN layer 3 gateways are implemented with no need to establish an entry backup link between the VXLAN layer 3 gateways.

Optionally, the method further includes generating, by the first VTEP device, the ARP entry based on the ARP request packet, storing, by the first VTEP device, the ARP entry, generating the ARP request packet based on the stored ARP entry, and sending the ARP request packet to a destination VTEP device through the failure-recovered VXLAN tunnel when the first VTEP device determines that a failure of a failed VXLAN tunnel is recovered, and generating the ARP request packet based on the stored ARP entry, and sending the ARP request packet to the destination VTEP device through the newly established VXLAN tunnel when the first VTEP device determines that a new VXLAN tunnel is established.

In the foregoing implementation, when the failure is recovered or a new VXLAN tunnel is established, the ARP packet does not need to be exchanged again.

According to a second aspect, a VXLAN packet forwarding method is provided, and the method includes receiving, by a second VTEP device through a first VXLAN tunnel, first state information from a first VTEP device, where the first state information is used to indicate a tunnel state of the first VXLAN tunnel, confirming, by the second VTEP device, the tunnel state of the first VXLAN tunnel as an active state, and setting a route priority at which an IP network reaches the second VTEP device to a first priority when the tunnel state carried in the first state information is an active state, where the IP network is used to send traffic to a host connected to the first VTEP device and is used to receive traffic from the host connected to the first VTEP device, the first priority is higher than the second priority, and the second priority is a route priority at which the IP network reaches the second VTEP device when the first VXLAN tunnel is in an inactive state, and forwarding, by the second VTEP device, the VXLAN packet through the first VXLAN tunnel in an active tunnel state.

In the foregoing implementation, a redundancy protection capability of a VXLAN network is improved, and it is ensured that an uplink traffic direction is consistent with a downlink traffic direction.

Optionally, the method further includes sending, by the second VTEP device through the first VXLAN tunnel, first reply information for the first state information to the first VTEP device, where the first reply information is used to instruct the second VTEP device to confirm the tunnel state of the first VXLAN tunnel.

Optionally, the method further includes switching, by the second VTEP device, the tunnel state of the first VXLAN tunnel to an inactive state, and switching from the route priority at which the IP network reaches the second VTEP device to the second priority when the second VTEP device determines that a failure occurs in the first VXLAN tunnel in an active tunnel state.

Optionally, the method further includes generating a link failure message when the second VTEP device determines that a failure occurs in a link between the second VTEP device and the IP network, where the link failure message is used to indicate that the failure occurs in the link between the second VTEP device and the IP network, sending, by the second VTEP device through the first VXLAN tunnel in an active tunnel state, the link failure message to the first VTEP device, receiving, by the second VTEP device through the first VXLAN tunnel, second state information from the first VTEP device, where the second state information carries an inactive state, and is used to indicate the tunnel state of the first VXLAN tunnel, and switching, by the second VTEP device based on the second state information, the tunnel state of the first VXLAN tunnel to an inactive state, and switching from the route priority at which the IP network reaches the second VTEP device to the second priority.

According to a third aspect, a first VTEP device is provided, and the first VTEP device has a function of implementing actions of the first VTEP device in the foregoing method. The function may be implemented by hardware, or may be implemented by hardware by executing corresponding software. The hardware or the software includes one or more modules corresponding to the foregoing function.

In a possible design, a structure of the first VTEP device includes a processor and an interface. The processor is configured to support the first VTEP device in performing corresponding functions in the foregoing method. The interface is configured to support communication between the first VTEP device and the second VTEP device, and send information or an instruction in the foregoing method to the second VTEP device, or receive the information or the instruction in the foregoing method from the second VTEP device. The first VTEP device may further include a memory, where the memory is configured to couple to the processor, and the memory stores program instructions and data that are required by the first VTEP device.

According to a fourth aspect, a second VTEP device is provided, and the second VTEP device has a function of implementing actions of the second VTEP device in the foregoing method. The function may be implemented by hardware, or may be implemented by hardware by executing corresponding software. The hardware or the software includes one or more modules corresponding to the foregoing function.

In a possible design, a structure of the second VTEP device includes a processor and an interface. The processor is configured to support the second VTEP device in performing corresponding functions in the foregoing method. The interface is configured to support communication between the second VTEP device and the first VTEP device, and send information or an instruction in the foregoing method to the first VTEP device, or receive the information or the instruction in the foregoing method from the first VTEP device. The second VTEP device may further include a memory, where the memory is configured to couple to the processor, and the memory stores program instructions and data that are required by the second VTEP device.

According to a fifth aspect, a computer storage medium is provided, and the computer storage medium is used to store a program, code, or an instruction that is used by the foregoing first VTEP device. When executing the program, code, or the instruction, the processor or a hardware device may complete functions or steps of the first VTEP device in the foregoing aspects.

According to a sixth aspect, a computer storage medium is provided, and the computer storage medium is used to store a program, code, or an instruction that is used by the foregoing second VTEP device. When executing the program, code, or the instruction, the processor or a hardware device may complete functions or steps of the second VTEP device in the foregoing aspects.

DESCRIPTION OF EMBODIMENTS

Embodiments of this application provide a VXLAN packet forwarding method, device, and system in order to improve a redundancy protection capability of a VXLAN network, and ensure that an uplink traffic direction is consistent with a downlink traffic direction.

The following provides detailed descriptions separately using specific embodiments.

To make the application objectives, features, and advantages of this application clearer and more comprehensible, the following clearly describes the technical solutions in the embodiments of this application with reference to the accompanying drawings in the embodiments of this application. The embodiments described in the following are merely some rather than all of the embodiments of this application. All other embodiments obtained by a person of ordinary skill in the art based on the embodiments of this application without creative efforts shall fall within the protection scope of this application.

In the specification, claims, and accompanying drawings of this application, the terms "first," "second," "third," "fourth," and so on are intended to distinguish between different objects but do not indicate a particular order. In addition, the terms "include" and "contain" mean to cover the non-exclusive inclusion, for example, a process, method, system, product, or device that includes a list of steps or units is not necessarily limited to the list of steps and units, but may further include steps and units not listed.

Figure 1:
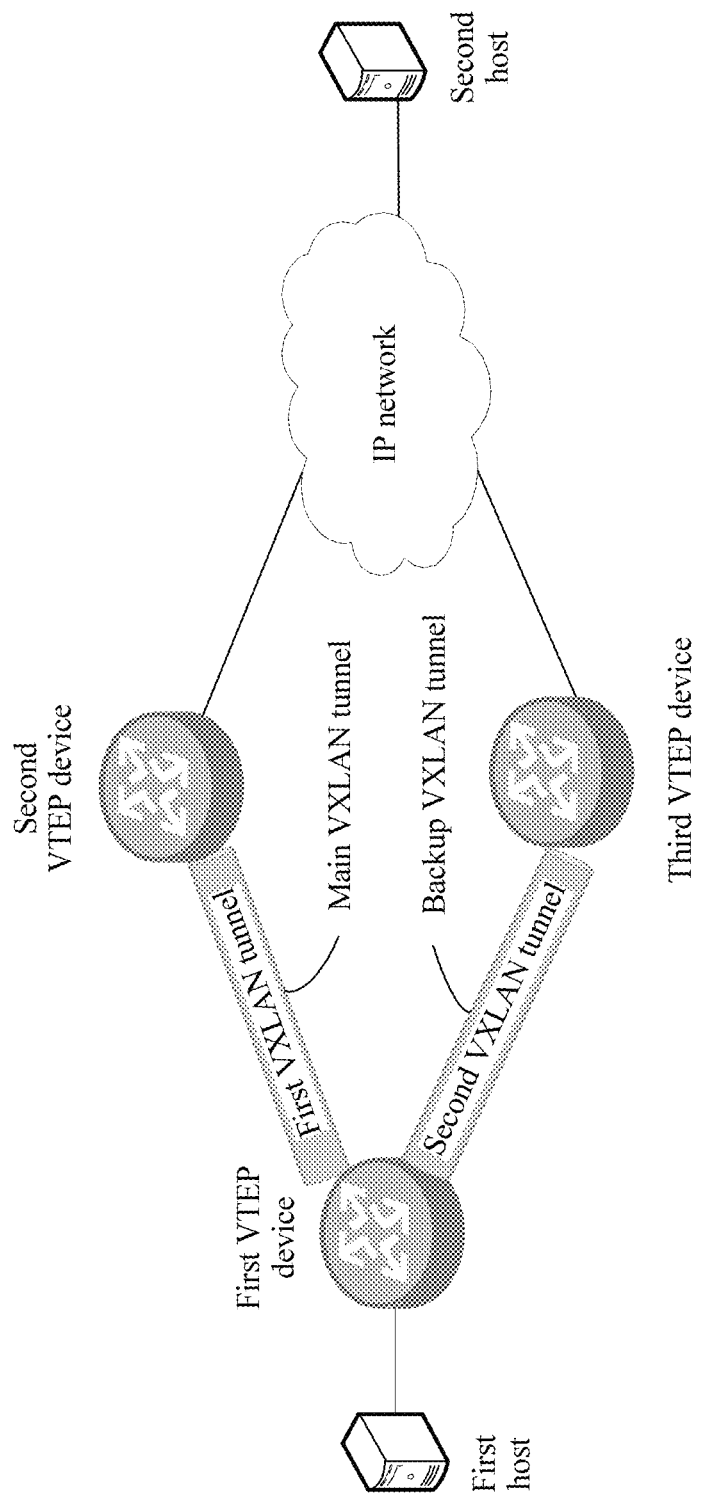
FIG. 1 is a schematic structural diagram of a VXLAN network according to an embodiment of this application.

FIG. 1 is a schematic structural diagram of a VXLAN network according to an embodiment of this application. As shown in FIG. 1, the VXLAN network includes a first VTEP device, a second VTEP device, and a third VTEP device. The first VTEP device communicates with the second VTEP device through a first VXLAN tunnel, and the first VTEP device communicates with the third VTEP device through a second VXLAN tunnel. In addition, the first VTEP device is connected to a first host such that the first VTEP device can receive traffic from the first host, and forward the traffic to the second VTEP device through the first VXLAN tunnel, or forward the traffic to the third VTEP device through the second VXLAN tunnel. Similarly, the first VTEP device may receive traffic from the second VTEP device through the first VXLAN tunnel, and send the traffic to the first host, or the first VTEP device may receive traffic from the third VTEP device through the second VXLAN tunnel, and send the traffic to the first host. The first host may be a VM. In addition, a quantity of VMs is not limited in this application, and the first VTEP device may be connected to a plurality of VMs. The VM may run in a server. One server may include at least one VM. In a possible implementation, one server may include a plurality of VMs. Different VMs may belong to different VXLAN network segments. In a VXLAN application scenario, a VTEP device may also be referred to as a Network Virtualization Edge (NVE) device. In some application scenarios, the VTEP device is considered as a module integrated in the NVE device. In this application, without special description, the VTEP device is equivalent to the NVE device.

In the network shown in FIG. 1, the second VTEP device communicates with an IP network through a communications link in order to transfer traffic that is from the first host to the IP network, or transfer traffic that is received from the IP network to the first host. Similarly, the third VTEP device communicates with the IP network through the communications link in order to transfer the traffic that is from the first host to the IP network, or transfer the traffic that is received from the IP network to the first host. In an actual scenario, a second host may be further connected to the IP network in order to implement traffic transmission performed by the first host based on the foregoing network structure to the second host, or implement traffic transmission performed by the second host based on the foregoing network structure to the first host. A specific implementation of the IP network is not limited in this application. For example, the IP network may be an Internet network or an L3 VPN network. The second host may be a server.

After receiving traffic from the first host, the first VTEP device encapsulates the traffic into a VXLAN packet in order to separately forward the packet to the second VTEP device or the third VTEP device through the first VXLAN tunnel and the second VXLAN tunnel. The second VTEP device or the third VTEP device decapsulates the received VXLAN packet, which is re-encapsulated into an IP packet and is sent to the IP network such that the traffic reaches the second host. Similarly, after receiving the traffic from the second host, the IP network encapsulates the traffic into an IP packet, and sends the IP packet to the second VTEP device or the third VTEP device. The second VTEP device or the third VTEP device re-decapsulates the received IP packet, which is re-encapsulated into a VXLAN packet and is sent to the first VTEP device such that the traffic reaches the first host.

For ease of description, in subsequent embodiments of this application, a direction in which traffic reaches, from the first host, the second host through the first VTEP device, the second VTEP device, the third VTEP device, and the IP network is referred to as an uplink traffic direction, and a direction in which traffic reaches, from the second host, the first host through the first VTEP device, the second VTEP device, the third VTEP device, and the IP network is referred to as a downlink traffic direction. The second VTEP device and the third VTEP device are used as VXLAN layer 3 gateways in order to implement transmission between the VXLAN network and the IP network. For ease of description, in subsequent embodiments of this application, a network including the first host, the first VTEP device, the second VTEP device, and the third VTEP device is referred to as a VXLAN network side, and a network including the second host, the IP network, the second VTEP device, and the third VTEP device is referred to as an IP network side. Further, on the VXLAN network side, a network structure including the first host and the first VTEP device is referred to as an access circuit (AC) on the VXLAN network side. Similarly, on the IP network side, a network structure including the second host and the IP network is referred to as an AC on the IP network side. Therefore, an interface that is disposed on the first VTEP device and that is configured to connect to the first host is referred to as an AC side interface of the VXLAN network, and an interface that is disposed on the first VTEP device and that is configured to connect to a VXLAN tunnel is referred to as a VXLAN tunnel interface.

In a multi-active gateway scenario, the second VTEP device and the third VTEP device form a load balancing group. The second VTEP device and the third VTEP device are used as the VXLAN layer 3 gateways. Gateway interfaces used by the two VXLAN layer 3 gateways to communicate with the VTEP device are configured with a same IP address and a same MAC address, and the two VXLAN layer 3 gateways are configured with a same virtual VTEP IP address. For example, in the uplink traffic direction, after receiving the traffic of the first host, the first VTEP device equally distributes the traffic to the first VXLAN tunnel and the second VXLAN tunnel using hash algorithm in order to forward the traffic to the second VTEP device and the third VTEP device. Therefore, in the multi-active gateway scenario, requirements on synchronization and latency are relatively high. In addition, when a failure occurs in a VXLAN tunnel or a gateway, for example, the first VXLAN tunnel or the second VTEP device, the traffic may avoid the failed VXLAN tunnel or the failure gateway based on a route convergence rule such that the traffic is switched to a second tunnel for transmission instead of being transferred through the first VXLAN tunnel. If the failure occurs on the IP network side, for example, a failure occurs in a link between the second VTEP device and the IP network, because the multi-active gateway is based on an ECMP manner, the first VTEP device still learns routes of the two VXLAN layer 3 gateways. Therefore, a load balancing mode on the VXLAN network side may not change. Therefore, a perfect redundancy protection mechanism cannot be provided in the multi-active gateway scenario.

Further, in the multi-active gateway scenario, because the ECMP manner is used, it cannot be ensured that the uplink traffic direction is consistent with the downlink traffic direction. For example, for the uplink traffic direction, the traffic from the first host reaches the second VTEP device through the first VXLAN tunnel, and finally reaches the second host. However, for the downlink traffic direction, the traffic sent by the second host to the first host may reach the first host through the third VTEP device and the second VXLAN tunnel. This makes it inconvenient for a firewall to perform detection on the traffic.

The embodiments of this application provide a VXLAN packet forwarding method, device, and system to improve a redundancy protection capability of a VXLAN network. Further, it is ensured that the uplink traffic direction is consistent with the downlink traffic direction by setting a route priority at which the IP network reaches the VXLAN layer 3 gateway.

In the embodiments of this application, without special description, the IP may be IP version 4 (IPv4), IP version 6 (IPv6), or a future IP.

FIG. 2A to FIG. 4B are flowcharts of a VXLAN packet forwarding method according to an embodiment of this application. To ensure clear description, the VXLAN packet forwarding method in this embodiment of this application is described with reference to VXLAN network structures shown in FIG. 1 and FIG. 5 to FIG. 7. It should be understood that implementations shown in FIG. 1 to FIG. 7 are merely some rather than all of the implementations of the technical solutions provided in this application. In this embodiment of this application, as shown in FIG. 1 and FIG. 5 to FIG. 7, two VXLAN tunnels (namely, a first VXLAN tunnel and a second VXLAN tunnel) and two corresponding VTEP devices (namely, a second VTEP device and a third VTEP device) are used as an example for description. It should be understood that the embodiments of this application may include more than two VXLAN tunnels and corresponding VTEP devices. For example, scenarios shown in FIG. 1 and FIG. 5 to FIG. 7 further include a third VXLAN tunnel and a corresponding fourth VTEP device, and the third VXLAN tunnel is a VXLAN tunnel between the first VTEP device and the fourth VTEP device. In a scenario including more than two VXLAN tunnels, one of the more than two VXLAN tunnels is used as a main VXLAN tunnel, and other VXLAN tunnels are used as backup VXLAN tunnels. For example, in a scenario including three VXLAN tunnels, a first VXLAN tunnel is used as the main VXLAN tunnel, and the second VXLAN tunnel and a third VXLAN tunnel are used as backup tunnels.

In this embodiment of this application, a tunnel state of a VXLAN tunnel includes two states an active state and an inactive state. State information is used to indicate the tunnel state of the VXLAN tunnel. When the state information carries the active state, it indicates that the VXLAN tunnel is in the active state, and transmission of data traffic is allowed, or when the state information carries the inactive state, it indicates that the VXLAN tunnel is in the inactive state, and transmission of data traffic is not allowed.

Figure 2A:
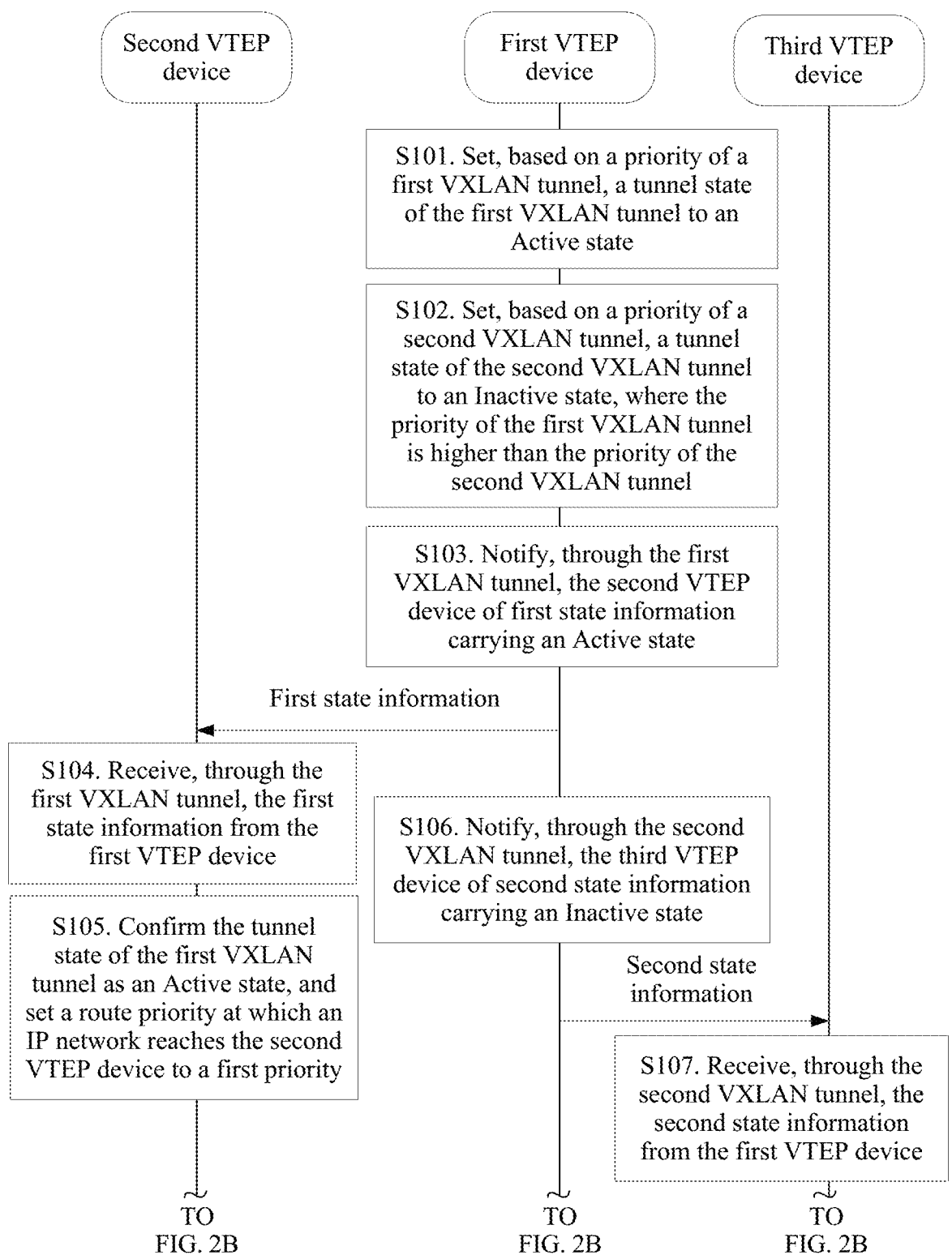
FIG. 2A and FIG. 2B are a flowchart of a VXLAN packet forwarding method according to an embodiment of this application.
Figure 2B:
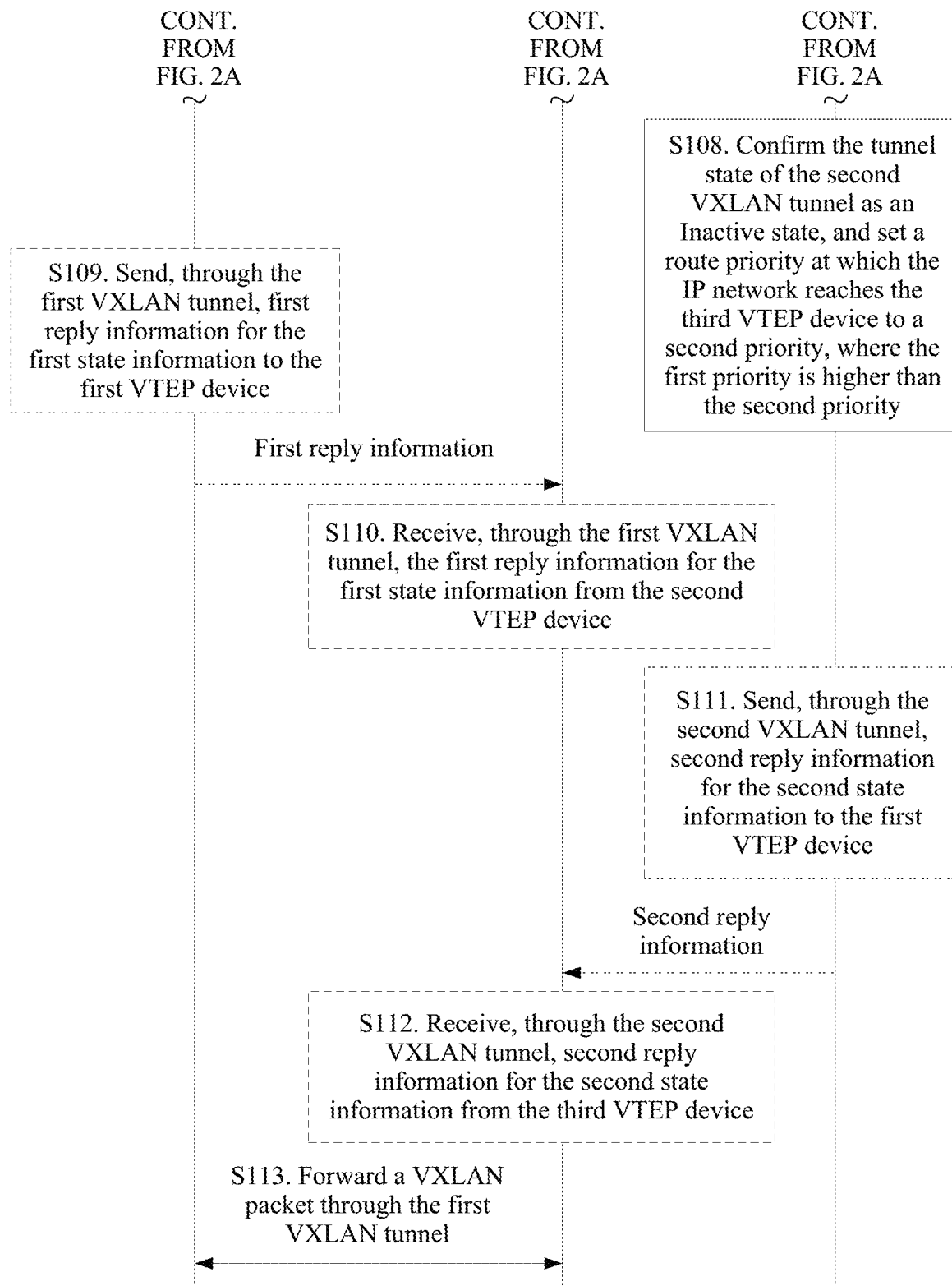

FIG. 2A-FIG. 2B are a flowchart of a VXLAN packet forwarding method according to an embodiment of this application. The method shown in FIG. 2A-FIG. 2B may be applied to a network structure shown in FIG. 1. Further, the method shown in FIG. 2A-FIG. 2B may be implemented together with a process in which the VXLAN tunnel is established, or may be implemented after the VXLAN tunnel is established. The method includes the following steps.

Step S101. A first VTEP device sets, based on a priority of a first VXLAN tunnel, a tunnel state of the first VXLAN tunnel to an active state.

Step S102. Set, based on a priority of a second VXLAN tunnel, a tunnel state of the second VXLAN tunnel to an inactive state, where the priority of the first VXLAN tunnel is higher than the priority of the second VXLAN tunnel.

With reference to the network structure shown in FIG. 1, the first VXLAN tunnel is a VXLAN tunnel between the first VTEP device and a second VTEP device, and the second VXLAN tunnel is a VXLAN tunnel between the first VTEP device and a third VTEP device. A VXLAN tunnel priority is configured in the first VTEP device, and the VXLAN tunnel priority includes a priority of the first VXLAN tunnel and a priority of the second VXLAN tunnel. In a possible implementation, the VXLAN tunnel priority may be statically configured by a network manager on the first VTEP device. In another possible implementation, the VXLAN tunnel priority may be automatically configured by a controller based on a network topology, and then the configured VXLAN tunnel priority is delivered to the first VTEP device. In still another possible implementation, the VXLAN tunnel priority may be automatically configured by the first VTEP device.

The VXLAN tunnel priority may be set to two levels, for example, a first priority and a second priority, and the first priority is higher than the second priority. A VXLAN tunnel configured with a high priority (for example, the first priority) may be referred to as a main VXLAN tunnel, and a VXLAN tunnel configured with a low priority (for example, the second priority) may be referred to as a backup VXLAN tunnel. In the network structure shown in FIG. 1, priorities of the first VXLAN tunnel and the second VXLAN tunnel are configured to ensure that a priority of the first VXLAN tunnel is higher than a priority of the second VXLAN tunnel. Therefore, the first VXLAN tunnel is the main VXLAN tunnel, and the second VXLAN tunnel is the backup VXLAN tunnel. In this embodiment and subsequent embodiments of this application, without special description or limitation, the first VXLAN tunnel is equivalent to the main VXLAN tunnel, and the second VXLAN tunnel is equivalent to the backup VXLAN tunnel. In a network structure including more than two VXLAN tunnels, the high priority (for example, the first priority) may be configured for one VXLAN tunnel, and the low priority (for example, the second priority) is configured for other VXLAN tunnels. For example, the network structure includes three VXLAN tunnels. A VXLAN tunnel 1 is configured with the first priority, and is referred to as the main VXLAN tunnel, and a VXLAN tunnel 2 and a VXLAN tunnel 3 are separately configured with the second priority, and are referred to as the backup VXLAN tunnels. In another possible implementation for the network structure including more than two VXLAN tunnels, the VXLAN tunnel priority may be set to a plurality of levels, for example, a first priority, a second priority, and a third priority. In addition, the first priority is higher than the second priority and the third priority, and the second priority is higher than the third priority. In this way, a VXLAN tunnel 1 is configured with the first priority, and is referred to as the main VXLAN tunnel, and a VXLAN tunnel 2 and a VXLAN tunnel 3 are separately configured with the second priority and the third priority, and are referred to as the backup VXLAN tunnels.

The VXLAN tunnel priority may be identified using tunnel priority information or an IP address of a tunnel destination VTEP device. For example, with reference to FIG. 1, in an implementation of statically configuring the VXLAN tunnel priority, the network manager sets tunnel priority information of the first VXLAN tunnel to 10 on the first VTEP device, and sets tunnel priority information of the second VXLAN tunnel to 5 such that the priority of the first VXLAN tunnel is higher than the priority of the second VXLAN tunnel. For another example, with reference to FIG. 1, in an implementation in which the first VTEP device automatically configures the VXLAN tunnel priority, the first VTEP device determines that the priority of the first VXLAN tunnel is higher than the priority of the second VXLAN tunnel by comparing a value of an IP address of the second VTEP device with a value of an IP address of the third VTEP device.

The first VTEP device further sets a tunnel state of the VXLAN tunnel based on the VXLAN tunnel priority, and the tunnel state includes an active state and an inactive state. The active state is used to indicate that VTEP devices at two ends of a VXLAN tunnel are allowed to forward a VXLAN packet through the VXLAN tunnel. The inactive state is used to indicate that VTEP devices at two ends of a VXLAN tunnel are not allowed to forward a VXLAN packet through the VXLAN tunnel. By default, the first VTEP device sets a tunnel state of the main VXLAN tunnel (a high-priority VXLAN tunnel) to the active state, and sets a tunnel state of the backup VXLAN tunnel (a low-priority VXLAN tunnel) to the inactive state. Therefore, in the network structure shown in FIG. 1, the first VTEP device sets the tunnel state of the first VXLAN tunnel to the active state, and sets the tunnel state of the second VXLAN tunnel to the inactive state.

With reference to the foregoing embodiment, the second VTEP device and the third VTEP device are used as VXLAN layer 3 gateways in order to implement transmission between the VXLAN network and the IP network. In this application, an IP address of the second VTEP device is different from an IP address of the third VTEP device in order to ensure that traffic can be transmitted through a VXLAN tunnel in the active state instead of flowing into a VXLAN tunnel in the inactive state. For example, the IP address of the second VTEP device is 2.2.2.2, and the IP address of the third VTEP device is 3.3.3.3. Further, a gateway interface used by the second VTEP device to communicate with the first VTEP device and a gateway interface used by the third VTEP device to communicate with the first VTEP device are configured with a same IP address and a same MAC address. The gateway interface is referred to as a bridge domain interface (BDIF). The BDIF is a layer 3 logical interface established based on a bridge domain (BD), and is used to implement communication between VMS in different subnetworks or between a VXLAN network and a non-VXLAN network. For example, a BDIF_10 is disposed on both the second VTEP device and the third VTEP device, an IP address of the BDIF_10 is IP_10, and a MAC address of the BDIF_10 is MAC_10. A plurality of BDIFs may be disposed on the second VTEP device and the third VTEP device in order to distinguish between different VXLAN network segments using the BDIFs. For example, in addition to the BDIF_10, a BDIF_20 is disposed on both the second VTEP device and the third VTEP device, an IP address of the BDIF_20 is IP_20, and a MAC address of the BDIF_20 is MAC_20. In this way, the BDIF_10 corresponds to a VXLAN network segment 1. Therefore, the second VTEP device and the third VTEP device are configured to forward uplink traffic of a VM belonging to the VXLAN network segment 1, or send downlink traffic to the VM belonging to the VXLAN network segment 1. The BDIF_20 corresponds to a VXLAN network segment 2. Therefore, the second VTEP device and the third VTEP device are configured to forward uplink traffic of a VM belonging to the VXLAN network segment 2, or send downlink traffic to the VM belonging to the VXLAN network segment 2. Correspondingly, the VXLAN network segment 1 is identified using a VNI_10, and the VXLAN network segment 2 is identified using a VNI_20 in order to distinguish between different VXLAN network segments.

Then, a process in which the first VTEP device and the second VTEP device configure the tunnel state of the first VXLAN tunnel is described in steps S103 to S105. Similarly, a process in which the first VTEP device and the third VTEP device configure the tunnel state of the second VXLAN tunnel is described in steps S106 to S108. It should be understood that there is no strict execution order between the process described in steps S103 to S105 and the process described in steps S106 to S108, and the two processes may be concurrently performed without affecting each other.

Step S103. The first VTEP device notifies, through the first VXLAN tunnel, the second VTEP device of first state information carrying an active state, where the first state information is used to indicate the tunnel state of the first VXLAN tunnel.

Step S104. The second VTEP device receives, through the first VXLAN tunnel, the first state information from the first VTEP device.

The first VTEP device sets the tunnel state of the first VXLAN tunnel to the active state. The active state may be carried in the first state information and sent to the second VTEP device through the first VXLAN tunnel. Correspondingly, the second VTEP device receives the first state information. The first state information is used to indicate the tunnel state of the first VXLAN tunnel.

A specific implementation of the first state information is not limited in this application. In a possible implementation, the active state is sent in an establishment process of the first VXLAN tunnel. Further, in the VXLAN network, the VXLAN tunnel may be established based on a Border Gateway Protocol (BGP) Ethernet Virtual Private Network (EVPN). The BGP EVPN is used to implement a VXLAN control plane. Based on an implementation of the BGP EVPN, after a BGP connection is established between the first VTEP device and the second VTEP device, and between the first VTEP device and the third VTEP device, an inclusive multicast route is transferred between the first VTEP device and the second VTEP device, and between the first VTEP device and the third VTEP device. The inclusive multicast route is used to generate a broadcast, unknown unicast, and multicast (BUM) forwarding table, and is used to automatically establish a VXLAN tunnel for transferring a VXLAN packet. Therefore, in the implementation, a type-length-value (TLV) is added to the inclusive multicast route when the first VTEP device sends the inclusive multicast route to the second VTEP device in order to form the first state information. A type of the TLV is Tunnel_Status, a length of the TLV is 1 byte, and a value is identified as active. Therefore, transferring of the first state information is completed in the establishment process of the first VXLAN tunnel.

In another possible implementation, the active state is sent after the first VXLAN tunnel is established. Further, the BGP EVPN includes a notification (Notification) message, and the Notification message is a notification message that is sent to a peer VTEP device when a local VTEP device detects an error. In this application, the Notification message is multiplexed in order to carry the tunnel state of the VXLAN tunnel. Therefore, the Notification message is not used to notify an error message, but is used to notify the tunnel state of the VXLAN tunnel. Therefore, the first state information may be the Notification message. For example, the first VTEP device sends the Notification message to the second VTEP device, and the Notification message carries the active state.

In still another possible implementation, the active state is sent after the first VXLAN tunnel is established. Further, the tunnel state of the VXLAN tunnel is carried in a Point-to-Point Protocol (PPP) over VXLAN packet. Therefore, the first state information may be the PPP over VXLAN packet. The PPP over VXLAN packet includes a VXLAN header and a VXLAN payload, the VXLAN payload includes a PPP packet, the PPP packet includes a PPP header and a PPP payload, and the PPP payload includes the tunnel state of the VXLAN tunnel. For example, the first VTEP device sends the PPP over VXLAN packet to the second VTEP device, and the PPP over VXLAN packet carries the active state. After receiving the PPP over VXLAN packet, the second VTEP device decapsulates the PPP over VXLAN packet to obtain the active state.

Step S105. The second VTEP device confirms the tunnel state of the first VXLAN tunnel as an active state, and sets a route priority at which an IP network reaches the second VTEP device to a first priority.

After receiving the first state information, the second VTEP device confirms the tunnel state of the first VXLAN tunnel as an active state based on an active state carried in the first state information. The second VTEP device may receive, through the first VXLAN tunnel, uplink traffic from a first host, and forward the uplink traffic to the IP network. The second VTEP device may also receive downlink traffic from the IP network, and forwards the downlink traffic to the first host through the first VXLAN tunnel.

As shown in FIG. 1, in a downlink traffic direction, traffic from the second host may reach the second VTEP device or the third VTEP device through the IP network. To ensure that the uplink traffic and the downlink traffic can be transmitted through the first VXLAN tunnel in an active state, the second VTEP device sets a route priority at which the IP network reaches the second VTEP device to the first priority, and notifies the IP network of the first priority. Further, the IP network includes a router, and the second VTEP device notifies the router in the IP network of the first priority. The first priority is higher than a route priority at which the IP network reaches the third VTEP device. After receiving the traffic from the second host, the IP network first selects, based on the first priority, a path in which the IP network reaches the second VTEP device to forward the traffic from the second host. Therefore, the traffic from the second host is diverted to the second VTEP device. The second VTEP device may forward the traffic from the second host through the first VXLAN tunnel in an active state. Therefore, the implementation provided in this embodiment can ensure that the uplink traffic and the downlink traffic can be transmitted through the first VXLAN tunnel in an active state.

Step S106. The first VTEP device notifies, through the second VXLAN tunnel, the third VTEP device of second state information carrying an inactive state, where the second state information is used to indicate the tunnel state of the second VXLAN tunnel.

Step S107. Receive, through the second VXLAN tunnel, the second state information from the first VTEP device.

The first VTEP device sets the tunnel state of the second VXLAN tunnel to an inactive state. The inactive state may be carried in the second state information and sent to the third VTEP device through the second VXLAN tunnel. Correspondingly, the third VTEP device receives the second state information. The second state information is used to indicate the tunnel state of the second VXLAN tunnel.

For a specific implementation of the second state information, refer to the foregoing description for steps S103 and S104. Details are not described herein again. In an implementation in which the inclusive multicast route is used, a type of the TLV is Tunnel_Status, a length of the TLV is 1 byte, and a value is identified as inactive. In an implementation in which the Notification message is used, the Notification message carries the inactive state. In an implementation in which the PPP over VXLAN packet is used, the PPP over VXLAN packet carries the inactive state.

Step S108. The third VTEP device confirms the tunnel state of the second VXLAN tunnel as an inactive state, and sets a route priority at which the IP network reaches the third VTEP device to a second priority, where the first priority is higher than the second priority.

After receiving the second state information, the third VTEP device confirms the tunnel state of the second VXLAN tunnel as an inactive state based on an inactive state carried in the second state information. The second VXLAN tunnel in an inactive state is in a blocked (non-working) state, and does not forward the uplink traffic and the downlink traffic.

With reference to the foregoing description of step S105, the third VTEP device sets the route priority at which the IP network reaches the third VTEP device to the second priority, where the first priority is higher than the second priority. The first priority is a route priority at which the IP network reaches the second VTEP device. After receiving the traffic from the second host, the IP network first selects, based on the first priority, a path in which the IP network reaches the second VTEP device to forward the traffic from the second host. Therefore, the traffic from the second host is diverted to the second VTEP device, and may not reach the third VTEP device, thereby preventing the traffic from the second host from flowing into the second VXLAN tunnel.

Step S113. The first VTEP device and the second VTEP device forward a VXLAN packet through the first VXLAN tunnel.

After completing a process in which the first VXLAN tunnel is set to an active state and the second VXLAN tunnel is set to an inactive state, the first VTEP device and the second VTEP device forward the uplink traffic and the downlink traffic through the first VXLAN tunnel in an active state, but the second VXLAN tunnel in an inactive state is in a blocked (non-working) state, and does not forward traffic.

According to the VXLAN packet forwarding method provided in this embodiment, tunnel states of at least two VXLAN tunnels that are connected to the local VTEP device are set using the local VTEP device based on priorities of the VXLAN tunnels. Then, the tunnel states of the VXLAN tunnels are sent to at least two peer VTEP devices. The at least two VXLAN tunnels are in a one-to-one correspondence with the at least two peer VTEP devices. The at least two peer VTEP devices separately confirm the received tunnel states of the VXLAN tunnels. Therefore, the VXLAN tunnel in an active state is in a working state and forwards traffic, and the VXLAN tunnel in an inactive state is in a non-working state and does not forward traffic. A redundancy protection capability of the VXLAN network is improved using the method provided in this embodiment. Further, a peer VTEP device connected to the VXLAN tunnel in an active state sets a route priority at which the IP network reaches the peer VTEP device to a first priority, a peer VTEP device connected to the VXLAN tunnel in an inactive state sets a route priority at which the IP network reaches the peer VTEP device to a second priority, and the first priority is higher than the second priority in order to ensure that an uplink traffic direction is consistent with a downlink traffic direction.

Optionally, between steps S105 and S113, the VXLAN packet forwarding method further includes the following steps.

Step S109. The second VTEP device sends, through the first VXLAN tunnel, first reply information for the first state information to the first VTEP device.

Step S110. The first VTEP device receives, through the first VXLAN tunnel, the first reply information for the first state information from the second VTEP device.

The second VTEP device confirms, based on the first state information, the tunnel state of the first VXLAN tunnel as an active state, sets the route priority at which the IP network reaches the second VTEP device to the first priority, and generates the first reply information based on the first state information. The first reply information is used to instruct the second VTEP device to confirm the tunnel state of the first VXLAN tunnel as an active state. The second VTEP device sends, through the first VXLAN tunnel, the first reply information to the first VTEP device. The first VTEP device determines, based on the received first reply information, that the second VTEP device has processed the first state information.

The first reply information may be implemented using the implementation of the first state information in steps S103 and S104. Details are not described herein again.

In the foregoing implementation, the first VTEP device triggers traffic forwarding when the second VTEP device receives and processes the first state information. This effectively improves reliability of a forwarding and execution process, and avoids packet loss caused by asynchronization between a setting process and a traffic forwarding process.

Optionally, between steps S108 and S113, the VXLAN packet forwarding method further includes the following steps.

Step S111. The third VTEP device sends, through the second VXLAN tunnel, second reply information for the second state information to the first VTEP device.

Step S112. The first VTEP device receives, through the second VXLAN tunnel, second reply information for the second state information from the third VTEP device.

Similar to the foregoing steps S109 and S110, after processing the second state information, the third VTEP device sends the second reply information to the first VTEP device. The second reply information is used to instruct the third VTEP device to confirm the tunnel state of the second VXLAN tunnel as an inactive state. The first VTEP device determines, based on the received second reply information, that the third VTEP device has processed the second state information.

The second reply information may be implemented using the implementation of the first state information in steps S103 and S104. Details are not described herein again.

It should be understood that there is no strict execution order between the process described in steps S109 to S110 and the process described in steps S111 to S112, and the two processes may be concurrently performed without affecting each other.

Figure 3A:
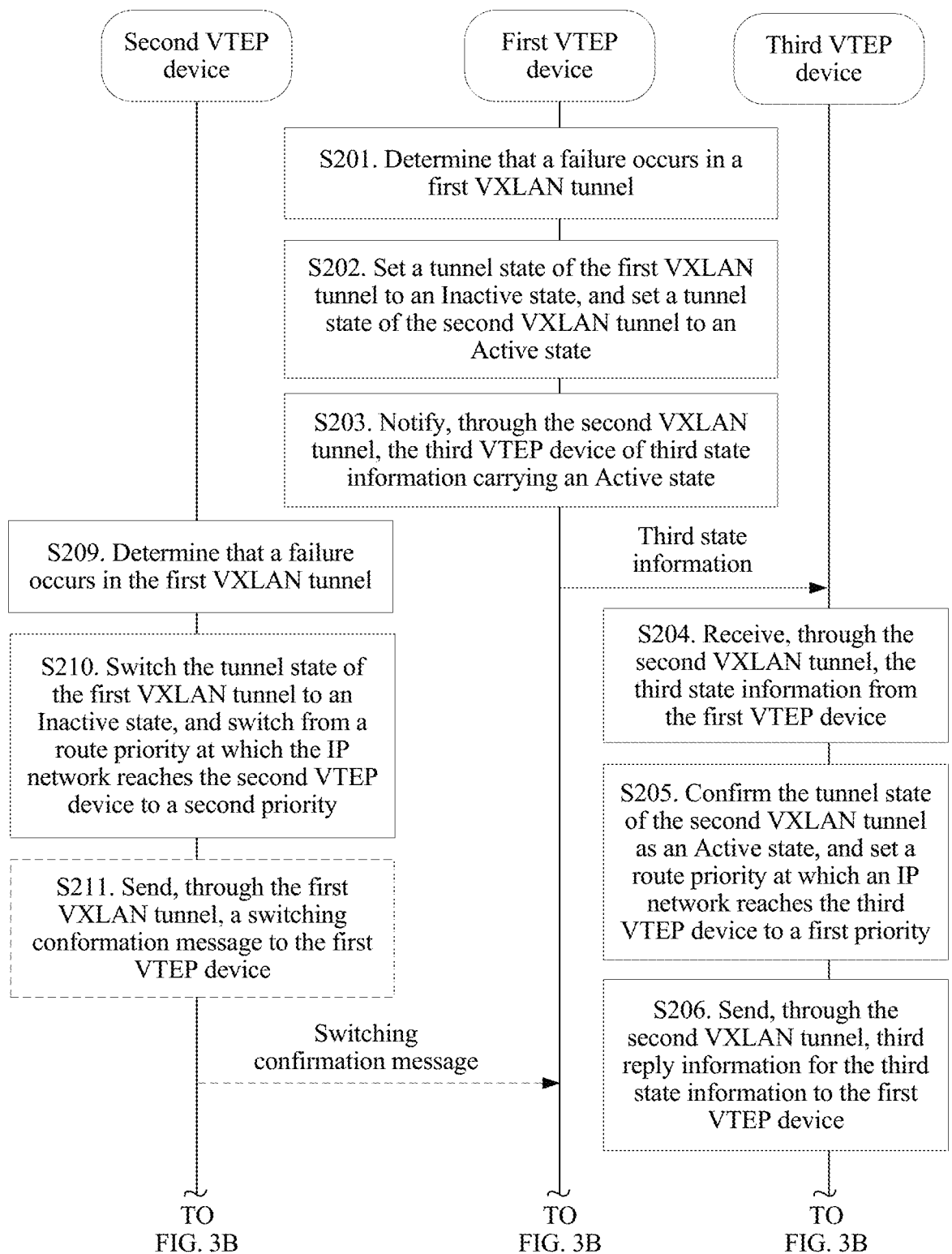
FIG. 3A and FIG. 3B are a flowchart of another VXLAN packet forwarding method according to an embodiment of this application.
Figure 3B:
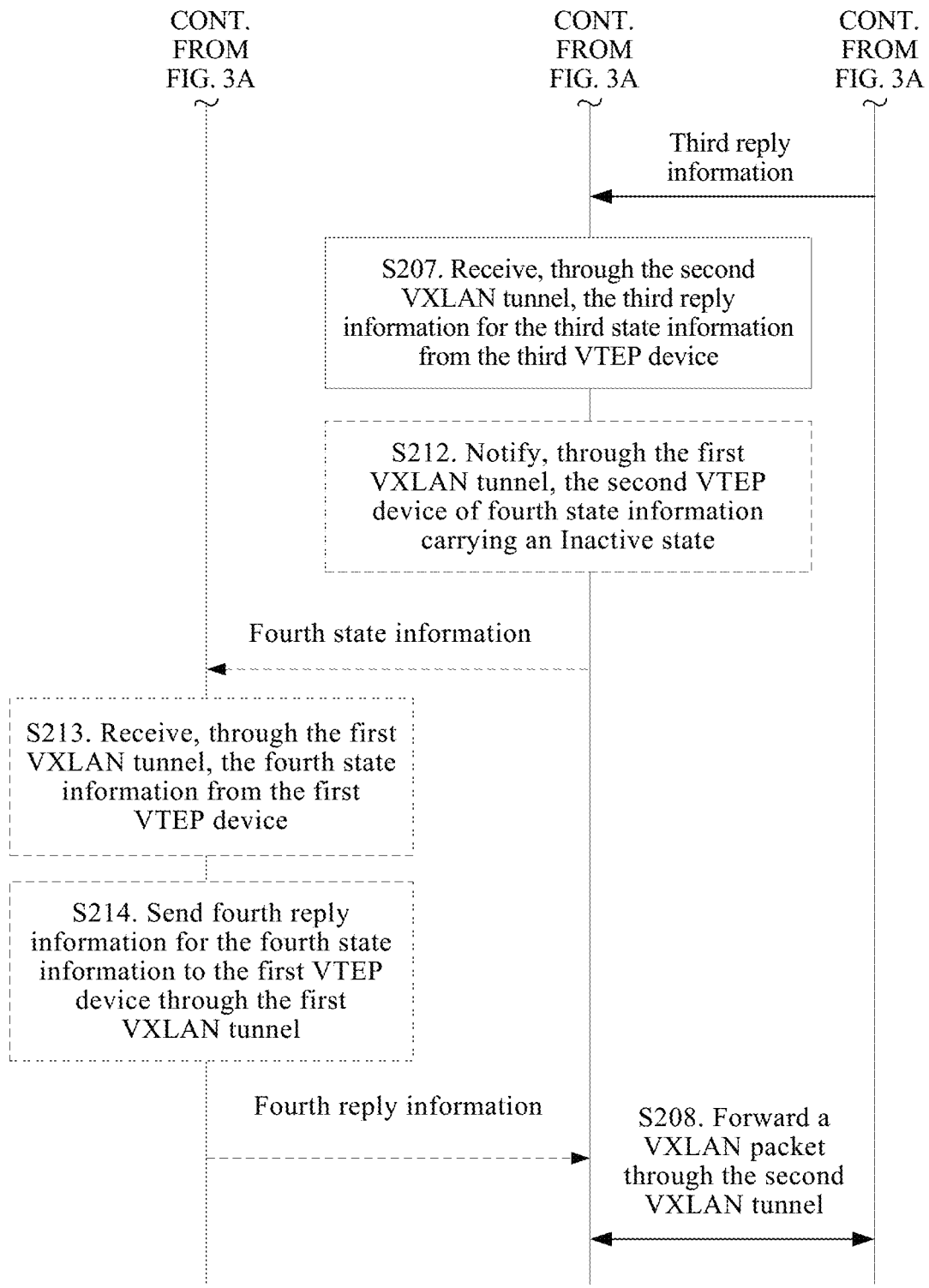
Figure 5:
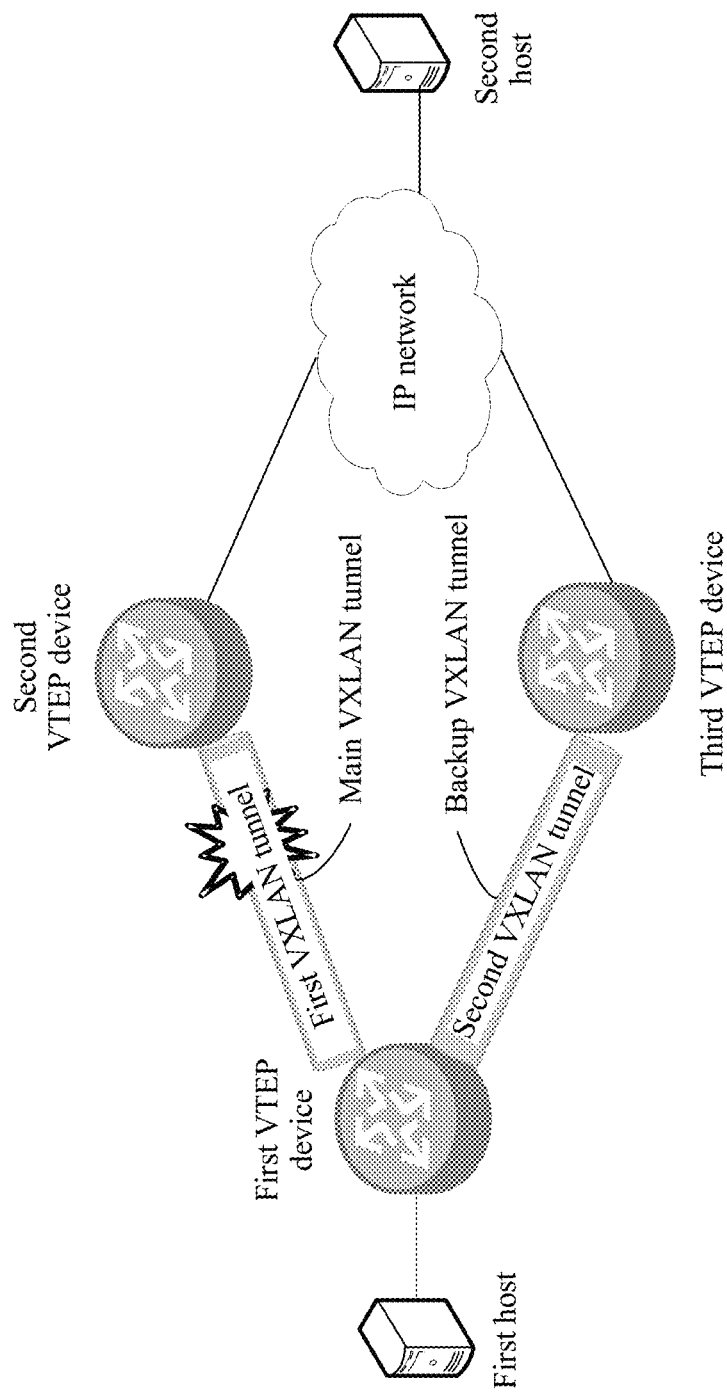
FIG. 5 is a schematic structural diagram of another VXLAN network according to an embodiment of this application.

FIG. 3A-FIG. 3B are a flowchart of another VXLAN packet forwarding method according to an embodiment of this application. The method shown in FIG. 3A-FIG. 3B is based on the method shown in FIG. 2A-FIG. 2B, and is an implementation of the VXLAN packet forwarding method when a failure occurs in a VXLAN tunnel in an active state. For example, the method shown in FIG. 3A-FIG. 3B may be applied to a network structure shown in FIG. 5. As shown in FIG. 5, a failure occurs in a first VXLAN tunnel. The method includes the following steps.

Step S201. A first VTEP device determines that the failure occurs in the first VXLAN tunnel.

Based on the method shown in FIG. 2A-FIG. 2B, in a normal running condition, a first VXLAN tunnel in an active state is in a working state and forwards traffic, and a second VXLAN tunnel in an inactive state is in a non-working state and does not forward traffic. The first VTEP device may send a first failure detection packet to the second VTEP device through the first VXLAN tunnel, and the first VTEP device receives, through the first VXLAN tunnel, a first reply packet of the first failure detection packet from the second VTEP device. When the first VTEP device cannot receive the first reply packet, the first VTEP device determines that a failure occurs in the first VXLAN tunnel. To ensure detection reliability, the first VTEP device periodically sends the first failure detection packet to the second VTEP device. A specific implementation of the first failure detection packet is not limited in this application. In a possible implementation, the first failure detection packet is a Bidirectional Forwarding Detection (BFD) packet. In another possible implementation, the first failure detection packet is an Ethernet operation, administration and maintenance (ETH OAM) packet. In still another possible implementation, the first failure detection packet is a Keepalive message based on a BGP EVPN.

Step S202. The first VTEP device sets a tunnel state of the first VXLAN tunnel to an inactive state, and sets a tunnel state of the second VXLAN tunnel to an active state.

After determining that a failure occurs in the first VXLAN tunnel in an active state, the first VTEP device triggers an action of switching the VXLAN tunnel. Further, the first VTEP device switches the first VXLAN tunnel from an active state to an inactive state, and switches the second VXLAN tunnel from an inactive state to an active state.

Step S203. The first VTEP device notifies, through the second VXLAN tunnel, the third VTEP device of third state information carrying an active state, where the third state information is used to indicate the tunnel state of the second VXLAN tunnel.

Step S204. The third VTEP device receives, through the second VXLAN tunnel, the third state information from the first VTEP device.

After the first VTEP device switches the second VXLAN tunnel from an inactive state to an active state, the first VTEP device notifies, through the second VXLAN tunnel, the third VTEP device of third state information carrying an active state. The third VTEP device receives the third state information. The third state information is used to indicate the tunnel state of the second VXLAN tunnel.

Step S205. The third VTEP device confirms the tunnel state of the second VXLAN tunnel as an active state, and sets a route priority at which an IP network reaches the third VTEP device to a first priority.

After receiving the third state information, the third VTEP device confirms the tunnel state of the second VXLAN tunnel as an active state based on the active state carried in the third state information, and sets the route priority at which the IP network reaches the third VTEP device to the first priority. For a specific implementation, refer to description of step S105 in the foregoing embodiment. Details are not described herein again.

Step S206. The third VTEP device sends, through the second VXLAN tunnel, third reply information for the third state information to the first VTEP device.

Step S207. The first VTEP device receives, through the second VXLAN tunnel, the third reply information for the third state information from the third VTEP device.

After processing the third state information, the third VTEP device generates third reply information based on the third state information. The third reply information is used to instruct the third VTEP device to update the tunnel state of the second VXLAN tunnel to an active state. The third VTEP device sends, through the second VXLAN tunnel, the third reply information to the first VTEP device. The first VTEP device determines, based on the received third reply information, that the third VTEP device has processed the third state information.

Step S208. The first VTEP device and the third VTEP device forward a VXLAN packet through the second VXLAN tunnel.

After completing switching of the tunnel state of the second VXLAN tunnel, the first VTEP device and the third VTEP device forward uplink traffic and downlink traffic through the second VXLAN tunnel in an active state.

When the first VTEP device and the third VTEP device perform steps S201 to S208, the second VTEP device performs steps S209 and S210. It should be understood that there is no strict execution order between the process described in steps S209 to S210 and the process described in steps S201 to S208, and the two processes may be concurrently performed without affecting each other.

Step S209. The second VTEP device determines that a failure occurs in the first VXLAN tunnel.

With reference to step S201 of the foregoing embodiment, when the first VTEP device sends the first failure detection packet to the second VTEP device through the first VXLAN tunnel, the second VTEP device sends a second failure detection packet to the first VTEP device through the first VXLAN tunnel. In addition, the second VTEP device receives, through the first VXLAN tunnel, a second reply packet of the second failure detection packet from the first VTEP device. When the second VTEP device cannot receive the second reply packet, the second VTEP device determines that a failure occurs in the first VXLAN tunnel. To ensure detection reliability, the second VTEP device periodically sends the second failure detection packet to the first VTEP device. For an implementation of the second failure detection packet, refer to corresponding description of step S201. Details are not described herein again.

Step S210. The second VTEP device switches the tunnel state of the first VXLAN tunnel to an inactive state, and switches from a route priority at which the IP network reaches the second VTEP device to a second priority.

After the second VTEP device determines that a failure occurs in the first VXLAN tunnel, the second VTEP device switches the first VXLAN tunnel from an active state to an inactive state, and switches from the route priority at which the IP network reaches the second VTEP device to the second priority. The first priority is higher than the second priority. By switching from the first priority to the second priority, it is ensured that traffic from the second host is diverted to the third VTEP device, and may not reach the second VTEP device, thereby preventing the traffic from the second host from flowing into the first VXLAN tunnel.

In step S210, the second VTEP device actively switches, based on a detected failure condition of the first VXLAN tunnel, the first VXLAN tunnel from an active state to an inactive state without using a manner of receiving state information from the first VTEP device to perform switching. This helps avoid a problem in which the state information cannot be sent because the failure occurs in the first VXLAN tunnel.

According to the foregoing implementation, when a failure occurs in a main VXLAN tunnel in an active state, the first VTEP device and the second VTEP device switch the main VXLAN tunnel from an active state to an inactive state, and the first VTEP device and the third VTEP device switch a backup VXLAN tunnel from an inactive state to an active state, thereby effectively improving a redundancy protection capability. In addition, switching of the route priority at which the IP network reaches the VTEP device ensures that the uplink traffic direction is consistent with the downlink traffic direction after switching between the main VXLAN tunnel and the backup VXLAN tunnel is performed.

Further, when the first VTEP device and the second VTEP device detect, based on a failure detection packet, that the failure in the main VXLAN tunnel is recovered, the first VTEP device, the second VTEP device, and the third VTEP device may re-switch, with reference to the implementations provided in FIG. 2A-FIG. 2B and FIG. 3A-FIG. 3B, the tunnel state of the first VXLAN tunnel from an inactive state to an active state, re-switch the tunnel state of the second VXLAN tunnel from an active state to an inactive state, and switch the route priority at which the IP network reaches the second VTEP device and the route priority at which the IP network reaches the third VTEP device.

The failure that occurs in the first VXLAN tunnel may be a complete physical disconnection, or may be a communication failure of a data plane. When the failure that occurs in the first VXLAN tunnel is a communication failure of the data plane, the failure may not affect communication of a control plane. That is, the control plane may perform normal communication when the data plane is disconnected.

Optionally, before S208, the method shown in FIG. 3A-FIG. 3B may further include the following steps.

Step S211. The second VTEP device sends, through the first VXLAN tunnel, a switching conformation message to the first VTEP device.

In this step, the second VTEP device sends the switching conformation message to the first VTEP device. If the failure of the first VXLAN tunnel is a communication failure of the data plane, and the control plane can perform normal communication, the first VTEP device may receive the switching conformation message. Therefore, step S211 helps improve reliability of tunnel state switching. An implementation of the switching conformation message may be implemented using the Notification message or the PPP over VXLAN packet in the foregoing embodiment.

Optionally, before step S208, the method shown in FIG. 3A-FIG. 3B may further include the following steps.

Step S212. The first VTEP device notifies, through the first VXLAN tunnel, the second VTEP device of fourth state information carrying an inactive state, where the fourth state information is used to indicate the tunnel state of the first VXLAN tunnel.

Step S213. The second VTEP device receives, through the first VXLAN tunnel, the fourth state information from the first VTEP device.

Step S214. Send fourth reply information for the fourth state information to the first VTEP device through the first VXLAN tunnel.

In step S212, the first VTEP device notifies the second VTEP device of the fourth state information carrying the inactive state. If the failure of the first VXLAN tunnel is a communication failure of the data plane, and the control plane can perform normal communication, the second VTEP device may receive the fourth state information. Based on steps S209 and S210, the second VTEP device has confirmed the tunnel state of the first VXLAN tunnel as an inactive state. The second VTEP device generates the fourth reply information for the fourth state information, and sends the fourth reply information to the first VTEP device such that the first VTEP device can learn that the second VTEP device has performed tunnel state switching. Therefore, steps S212 to S214 help improve reliability of tunnel state switching.

In step S201, the first VTEP device determines, based on the first failure detection packet, that the failure occurs in the first VXLAN tunnel. However, the first VTEP device cannot learn a cause for the failure based on the first failure detection packet.

In a possible implementation, the failure is shown in FIG. 5, and the first VTEP device and the second VTEP device may implement tunnel state switching based on the method shown in FIG. 3A-FIG. 3B.

Figure 6:
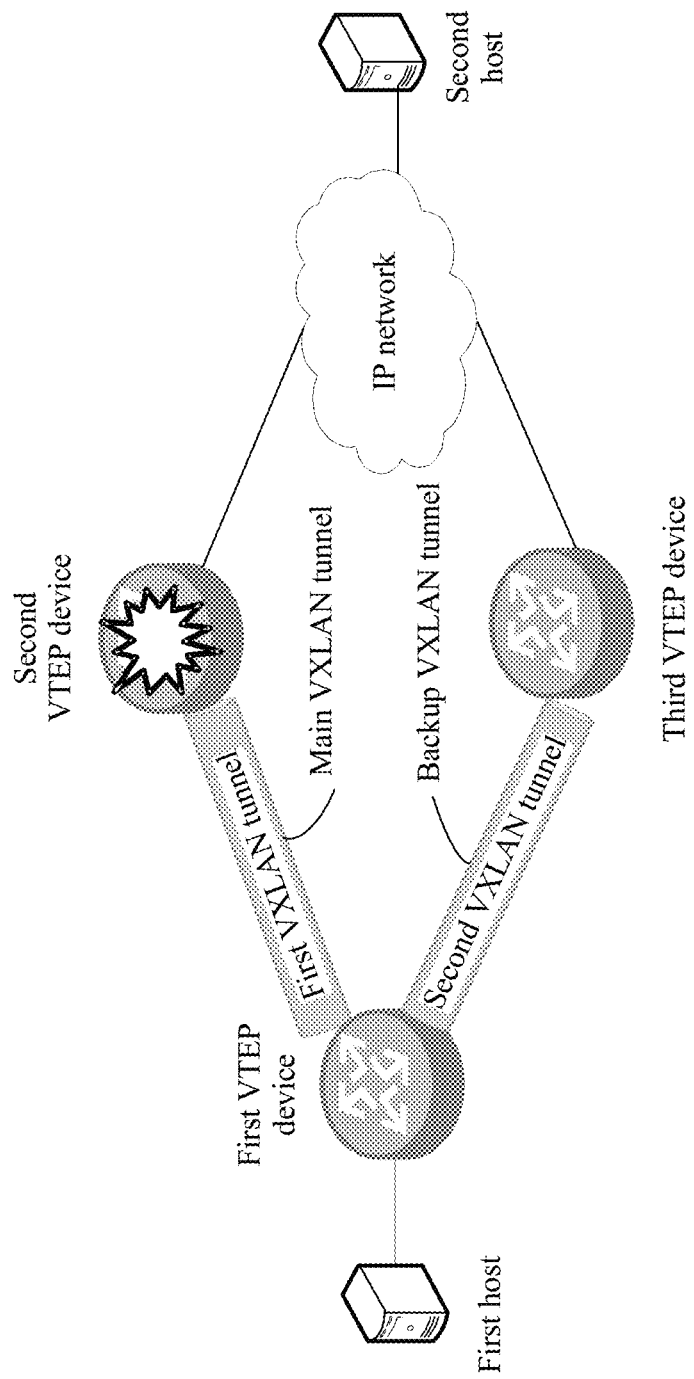
FIG. 6 is a schematic structural diagram of still another VXLAN network according to an embodiment of this application.

In another possible implementation, the failure is shown in FIG. 6, and a failure occurs in the second VTEP device. In this case, the second VTEP device cannot complete operations of steps S209 and S210, and cannot complete optional operations of steps S211, S213, and S214. The first VTEP device and the third VTEP device may complete normal switching of the tunnel state of the second VXLAN tunnel based on the method shown in FIG. 3A-FIG. 3B. In addition, the first VTEP device has set the tunnel state of the first VXLAN tunnel to an inactive state, and therefore, the uplink traffic direction may be forwarded through the second VXLAN tunnel in an active state instead of being forwarded through the first VXLAN tunnel. For the downlink traffic direction, because of the failure of the second VTEP device, a route in which the IP network reaches the second VTEP device is revoked according to a route convergence rule. The IP network may send downlink traffic to the third VTEP device rather than the second VTEP device such that the downlink traffic reaches the first VTEP device through the second VXLAN tunnel. Therefore, the method shown in FIG. 3A-FIG. 3B may be applied to both a failure scenario shown in FIG. 5 and a failure scenario shown in FIG. 6.

Implementations of the third state information, the third reply information, the fourth state information, and the fourth reply information may be implemented using the Notification message or the PPP over VXLAN packet in the foregoing embodiment.

Figure 4A:
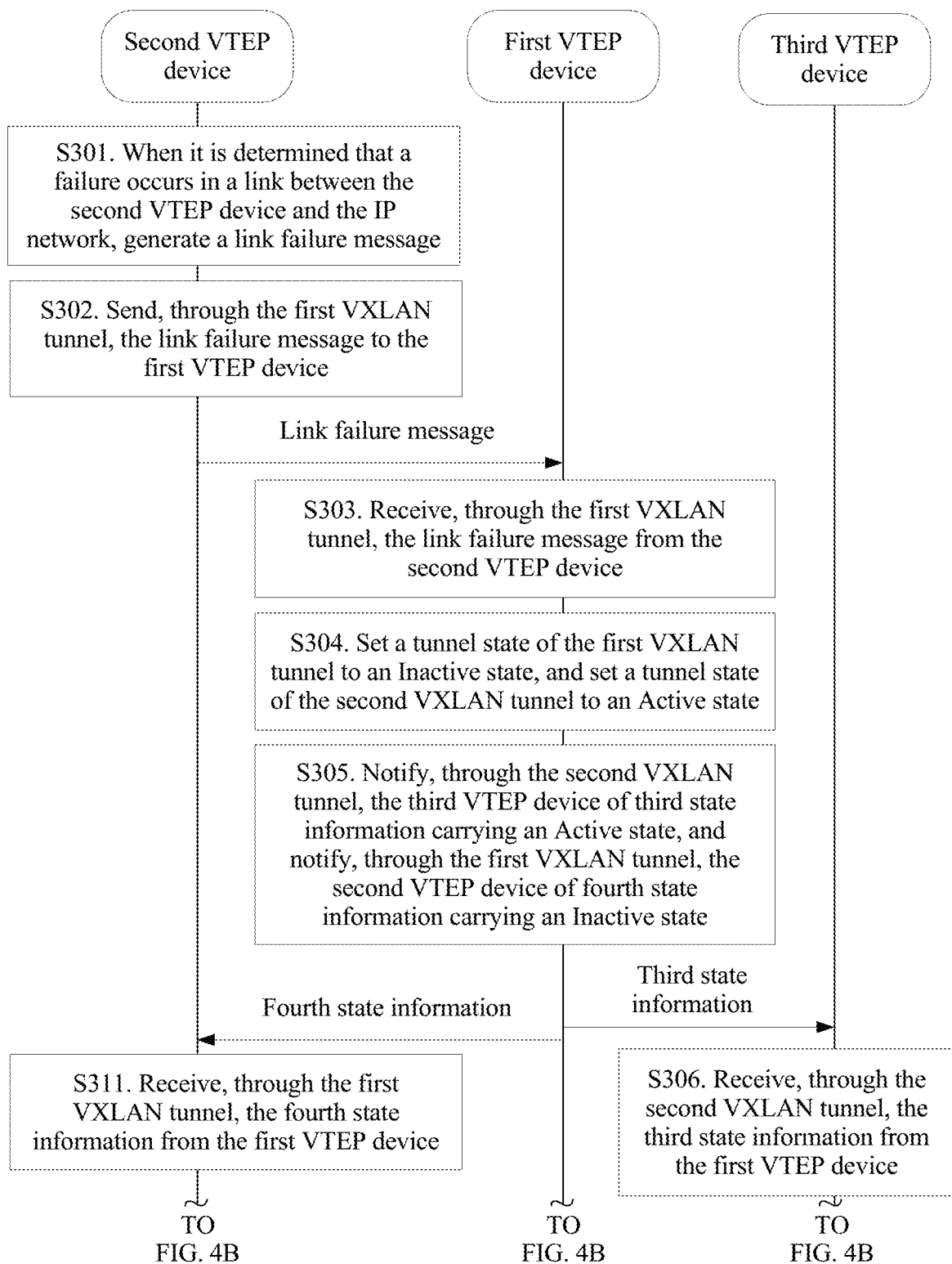
FIG. 4A and FIG. 4B are a flowchart of still another VXLAN packet forwarding method according to an embodiment of this application.
Figure 4B:
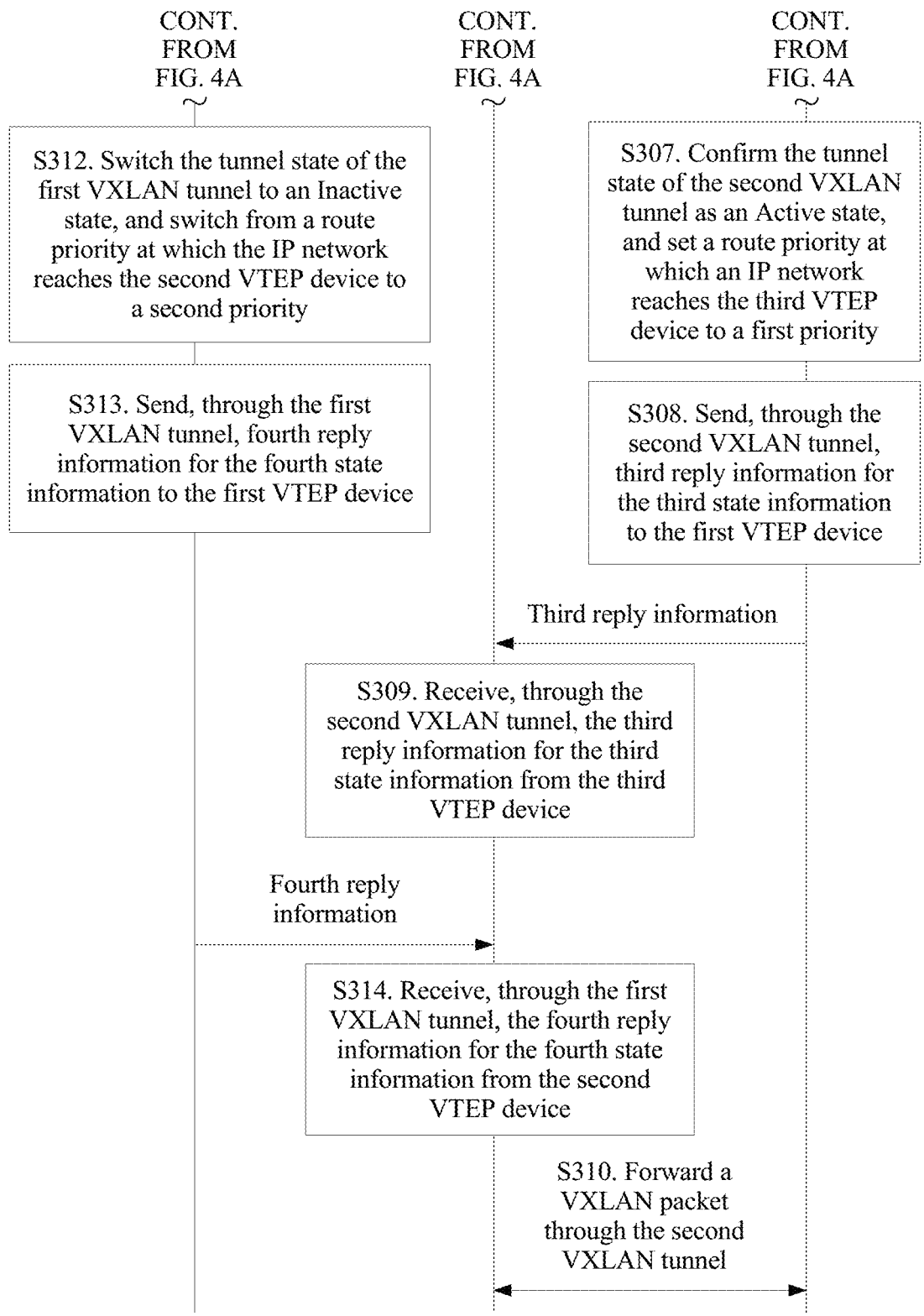
Figure 7:
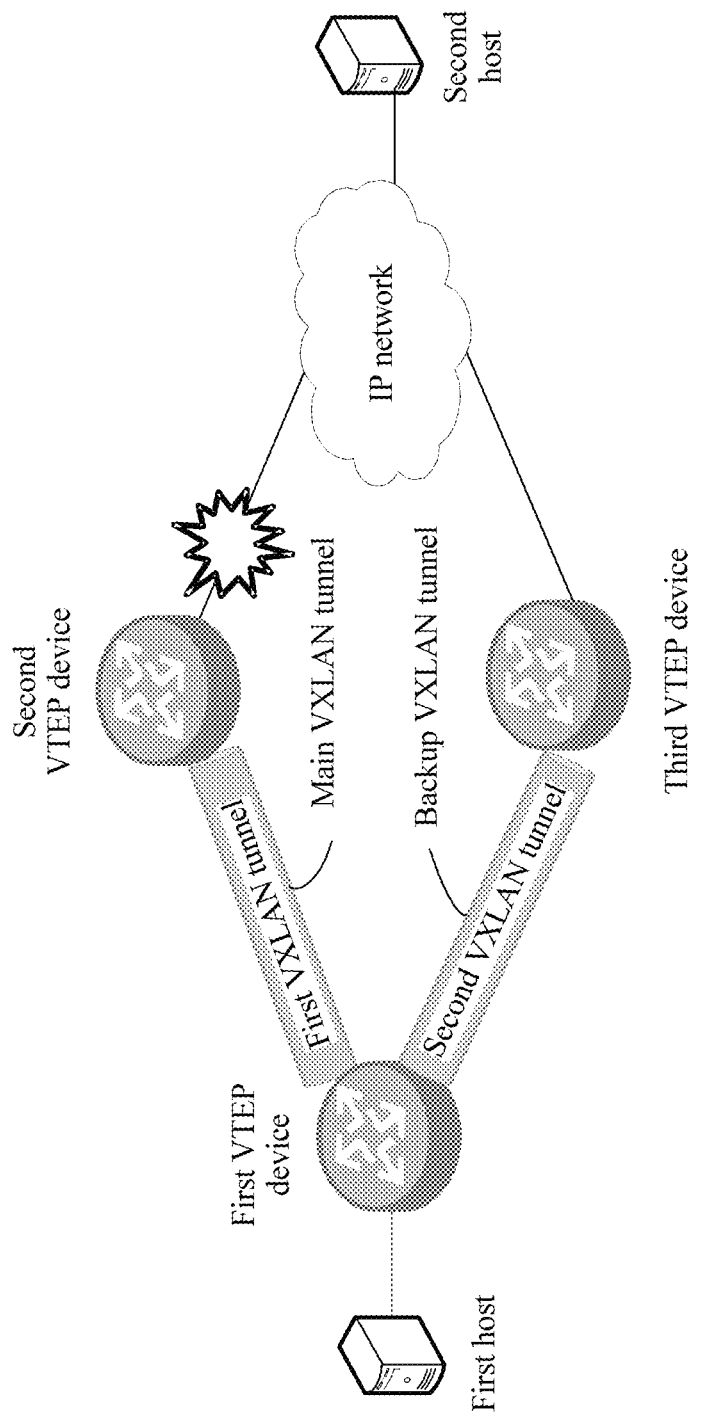
FIG. 7 is a schematic structural diagram of yet another VXLAN network according to an embodiment of this application.

FIG. 4A-FIG. 4B are a flowchart of still another VXLAN packet forwarding method according to an embodiment of this application. The method shown in FIG. 4A-FIG. 4B is based on the method shown in FIG. 2A-FIG. 2B, and is an implementation of the VXLAN packet forwarding method when a failure occurs in a link between a second VTEP device and an IP network. For example, the method shown in FIG. 4A-FIG. 4B may be applied to a network structure shown in FIG. 7. As shown in FIG. 7, the failure occurs in the link between the second VTEP device and the IP network. The method includes the following steps.

Step S301. When the second VTEP device determines that the failure occurs in the link between the second VTEP device and the IP network, the second VTEP device generates a link failure message.

The second VTEP device determines that a manner of sending a failure detection packet to the IP network may be used to determine whether the failure occurs in the link between the second VTEP device and the IP network. Further, for an implementation of the failure detection packet, refer to description of step S201 in the foregoing embodiment. Details are not described herein again. When the failure occurs in the link between the second VTEP device and the IP network, the second VTEP device generates the link failure message. An implementation of the link failure message may be implemented using the Notification message or the PPP over VXLAN packet in the foregoing embodiment.

Step S302. The second VTEP device sends, through the first VXLAN tunnel, the link failure message to the first VTEP device.

Step S303. The first VTEP device receives, through the first VXLAN tunnel, the link failure message from the second VTEP device.

After generating the link failure message, the second VTEP device sends the link failure message to the first VTEP device, and the first VTEP device receives the link failure message.

Step S304. The first VTEP device sets a tunnel state of the first VXLAN tunnel to an inactive state, and sets a tunnel state of the second VXLAN tunnel to an active state.

The first VTEP device determines, based on the link failure message, that the failure occurs in the link between the second VTEP device and the IP network, and triggers an action of switching the VXLAN tunnel. Further, the first VTEP device switches the first VXLAN tunnel from an active state to an inactive state, and switches the second VXLAN tunnel from an inactive state to an active state.

Step S305. The first VTEP device notifies, through the second VXLAN tunnel, the third VTEP device of third state information carrying an active state, and notifies, through the first VXLAN tunnel, the second VTEP device of fourth state information carrying an inactive state, where the third state information is used to indicate the tunnel state of the second VXLAN tunnel, and the fourth state information is used to indicate the tunnel state of the first VXLAN tunnel.

The first VTEP device generates the third state information carrying the active state, and sends the third state information to the third VTEP device, and the first VTEP device generates the fourth state information carrying the inactive state, and sends the fourth state information to the second VTEP device.

Step S306. The third VTEP device receives, through the second VXLAN tunnel, the third state information from the first VTEP device.

Step S307. The third VTEP device confirms the tunnel state of the second VXLAN tunnel as an active state, and sets a route priority at which an IP network reaches the third VTEP device to a first priority.

Step S308. The third VTEP device sends, through the second VXLAN tunnel, third reply information for the third state information to the first VTEP device.

Step S309. The first VTEP device receives, through the second VXLAN tunnel, the third reply information for the third state information from the third VTEP device.

Step S310. The first VTEP device and the third VTEP device forward a VXLAN packet through the second VXLAN tunnel.

For a specific implementation of steps S306 to S310, refer to corresponding description of steps S204 to S208 in the foregoing embodiment. Details are not described herein again.

A process in which the first VTEP device and the third VTEP device configure the tunnel state of the second VXLAN tunnel is described in steps S306 to S309. Similarly, a process in which the first VTEP device and the second VTEP device configure the tunnel state of the first VXLAN tunnel is described in steps S311 to S314. It should be understood that there is no strict execution order between the process described in steps S306 to S309 and the process described in steps S311 to S314, and the two processes may be concurrently performed without affecting each other.

Before step S310, the method further includes the following steps.

Step S311. The second VTEP device receives, through the first VXLAN tunnel, the fourth state information from the first VTEP device.

Step S312. The second VTEP device switches the tunnel state of the first VXLAN tunnel to an inactive state, and switches from a route priority at which the IP network reaches the second VTEP device to a second priority.

Step S313. The second VTEP device sends, through the first VXLAN tunnel, fourth reply information for the fourth state information to the first VTEP device.

Step S314. The first VTEP device receives, through the first VXLAN tunnel, the fourth reply information for the fourth state information from the second VTEP device.

For a specific implementation of steps S311 to S314, refer to corresponding description of FIG. 2A-FIG. 2B and FIG. 3A-FIG. 3B in the foregoing embodiment. Details are not described herein again.

Implementations of the third state information, the third reply information, the fourth state information, and the fourth reply information may be implemented using the Notification message or the PPP over VXLAN packet in the foregoing embodiment.

According to the foregoing implementation, when a main VXLAN tunnel in an active state receives the link failure message indicating that the failure occurs in the link between the second VTEP device and the IP network, the first VTEP device and the second VTEP device switch the main VXLAN tunnel from an active state to an inactive state, and the first VTEP device and the third VTEP device switch a backup VXLAN tunnel from an inactive state to an active state, thereby effectively improving a redundancy protection capability. In addition, switching of the route priority at which the IP network reaches the VTEP device ensures that an uplink traffic direction is consistent with a downlink traffic direction after switching between the main VXLAN tunnel and the backup VXLAN tunnel is performed.

Further, when the first VTEP device receives a message indicating that the failure of the link between the second VTEP device and the IP network is recovered, the first VTEP device, the second VTEP device, and the third VTEP device may re-switch, with reference to the implementations provided in FIG. 2A-FIG. 2B and FIG. 4A-FIG. 4B, the tunnel state of the first VXLAN tunnel from an inactive state to an active state, re-switch the tunnel state of the second VXLAN tunnel from an active state to an inactive state, and switch a route priority at which the IP network reaches the second VTEP device and a route priority at which the IP network reaches the third VTEP device.

In the methods shown in FIG. 2A-FIG. 2B to FIG. 4A-FIG. 4B, optionally, the methods further include receiving, by the first VTEP device, an ARP request packet from a host, where the ARP request packet is used to request a MAC address of a VXLAN gateway, and sending, by the first VTEP device respectively through the first VXLAN tunnel and the second VXLAN tunnel, the ARP request packet to the second VTEP device and the third VTEP device such that the second VTEP device and the third VTEP device generate ARP entries based on the ARP request packet.

The host and a VXLAN layer 3 gateway need to exchange ARP packets for providing guidance for traffic forwarding. For example, in the method shown in FIG. 2A-FIG. 2B, the first VXLAN tunnel is in an active state. The host generates the ARP request packet. A source MAC address of the ARP request packet is a MAC address of the host, and a source IP address of the ARP request packet is an IP address of the host. A destination IP address of the ARP request packet is an IP address of a BDIF of the second VTEP device. Based on the foregoing embodiment, for example, the IP address of the BDIF is IP_10 of BDIF_10. The ARP request packet is used to request the MAC address of the VXLAN gateway. Based on the foregoing embodiment, the ARP request packet is used to request a MAC address of the second VTEP device (for example, MAC_10). After receiving the ARP request packet, the first VTEP device encapsulates the ARP request packet to a VXLAN packet, and sends the VXLAN packet to the second VTEP device through the first VXLAN tunnel. After obtaining the ARP request packet, the second VTEP device generates an ARP entry, and generates a MAC entry based on the ARP entry. In addition, the second VTEP device further sends an ARP reply packet to the host. The ARP reply packet carries a MAC address of the BDIF of the second VTEP device. Based on the foregoing embodiment, for example, the MAC address of the BDIF is MAC_10 of BDIF_10.

Based on the methods shown in FIG. 2A-FIG. 2B to FIG. 4A-FIG. 4B, a VXLAN tunnel in an active state is used to transmit a VXLAN packet, and a VXLAN tunnel in an inactive state does not transmit a VXLAN packet. In this embodiment, when the first VTEP device receives the ARP request packet from the host, the ARP request packet is sent to the second VTEP device through the first VXLAN tunnel in an active state based on the foregoing method, and the ARP request packet is sent to the third VTEP device through the second VXLAN tunnel in an inactive state. In this way, after obtaining the ARP request packet, the third VTEP device generates an ARP entry, and generates a MAC entry based on the ARP entry. In addition, the third VTEP device further sends an ARP reply packet to the host, and the ARP reply packet carries a MAC address of a BDIF of the third VTEP device.

According to the foregoing implementation, based on a manner in which the first VTEP device transmits the ARP request packet through two VXLAN tunnels, the ARP request packet is transmitted through the first VXLAN tunnel in an active state, and therefore, the second VTEP device can learn the ARP entry and the MAC entry. In addition, the ARP request packet is transmitted through the second VXLAN tunnel in an inactive state, and therefore, the third VTEP device can also learn the ARP entry and the MAC entry. Therefore, ARP entry synchronization and MAC entry synchronization between VXLAN layer 3 gateways are implemented with no need to establish an entry backup link between VXLAN layer 3 gateways.

It should be understood that in an actual application scenario, the VXLAN packet forwarding method of this application may be an existing manner in which the entry backup link is established between the VXLAN layer 3 gateways to implement ARP entry synchronization and MAC entry synchronization between the VXLAN layer 3 gateways. To achieve a better beneficial effect, the VXLAN packet forwarding method of this application may use the foregoing example implementation to implement ARP entry synchronization and MAC entry synchronization between the VXLAN layer 3 gateways.

Optionally, the methods further include generating, by the first VTEP device, the ARP entry based on the ARP request packet, storing, by the first VTEP device, the ARP entry, generating the ARP request packet based on the stored ARP entry, and sending the ARP request packet to a destination VTEP device through the failure-recovered VXLAN tunnel when the first VTEP device determines that a failure of a failed VXLAN tunnel is recovered, and generating the ARP request packet based on the stored ARP entry, and sending the ARP request packet to the destination VTEP device through the newly established VXLAN tunnel when the first VTEP device determines that a new VXLAN tunnel is established.

As shown in FIG. 5 and FIG. 6, when a failure occurs in the first VXLAN tunnel or the second VTEP device, the ARP request packet may not be sent to the second VTEP device. For another example, a fourth VTEP device is added to the network structure shown in FIG. 1 as a new VXLAN layer 3 gateway. The fourth VTEP device is connected to the first VTEP device through a third VXLAN tunnel. The fourth VTEP device is a newly added VXLAN layer 3 gateway, and therefore, neither ARP entry nor MAC entry is stored in the fourth VTEP device.

In this implementation, after receiving the ARP request packet, the first VTEP device generates the ARP entry based on the ARP request packet. The first VTEP device stores the ARP entry in a temporary memory of the first VTEP device.

In a possible implementation, when the first VTEP device determines that the failure of the first VXLAN tunnel is recovered, the first VTEP device generates the ARP request packet based on the stored ARP entry, and sends the ARP request packet to the second VTEP device through the first VXLAN tunnel. In another possible implementation, when the first VTEP device determines that the third VXLAN tunnel exists, the first VTEP device generates the ARP request packet based on the stored ARP entry, and sends the ARP request packet to the fourth VTEP device through the third VXLAN tunnel.

In the foregoing implementation, when the failure is recovered or a new VXLAN tunnel is established, the ARP packet does not need to be exchanged again.

Figure 8:
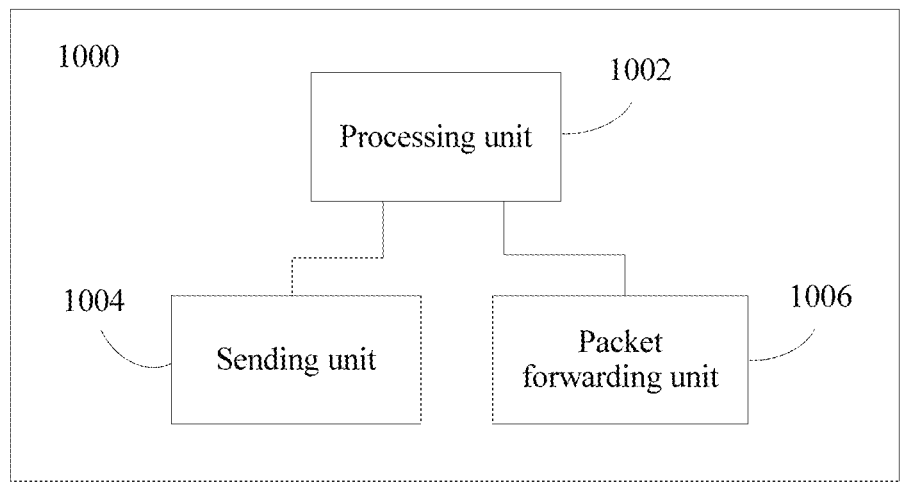
FIG. 8 is a schematic structural diagram of a first VTEP device according to an embodiment of the present application.

FIG. 8 is a schematic structural diagram of a first VTEP device 1000 according to an embodiment of the present application. The first VTEP device 1000 shown in FIG. 8 may perform corresponding steps that are performed by the first VTEP device in the method of the foregoing embodiment. As shown in FIG. 8, the first VTEP device 1000 includes a processing unit 1002, a sending unit 1004, and a packet forwarding unit 1006.

The processing unit 1002 is configured to set, based on a priority of a first VXLAN tunnel, a tunnel state of the first VXLAN tunnel to an active state, where the first VXLAN tunnel is a VXLAN tunnel between the first VTEP device 1000 and a second VTEP device.

The processing unit 1002 is further configured to set, based on a priority of a second VXLAN tunnel, a tunnel state of the second VXLAN tunnel to an inactive state, where the second VXLAN tunnel is a VXLAN tunnel between the first VTEP device 1000 and a third VTEP device, the priority of the first VXLAN tunnel is higher than the priority of the second VXLAN tunnel, and an IP address of the second VTEP device is different from an IP address of the third VTEP device.

The sending unit 1004 is configured to notify, through the first VXLAN tunnel, the second VTEP device of first state information carrying an active state, where the first state information is used to indicate the tunnel state of the first VXLAN tunnel.

The sending unit 1004 is further configured to notify, through the second VXLAN tunnel, the third VTEP device of second state information carrying an inactive state, where the second state information is used to indicate the tunnel state of the second VXLAN tunnel.

The packet forwarding unit 1006 is configured to forward the VXLAN packet through the first VXLAN tunnel in an active tunnel state.

Optionally, the first VTEP device 1000 further includes a receiving unit (not shown), and before the packet forwarding unit 1006 forwards the VXLAN packet through the first VXLAN tunnel in an active tunnel state, the receiving unit is configured to receive, through the first VXLAN tunnel, first reply information for the first state information from the second VTEP device, where the first reply information is used to instruct the second VTEP device to confirm the tunnel state of the first VXLAN tunnel as an active state, and receive, through the second VXLAN tunnel, second reply information for the second state information from the third VTEP device, where the second reply information is used to instruct the third VTEP device to confirm the tunnel state of the second VXLAN tunnel as an inactive state.

Optionally, when the first VTEP device 1000 determines that a failure occurs in the first VXLAN tunnel, the processing unit 1002 is further configured to set the tunnel state of the first VXLAN tunnel to an inactive state, and set the tunnel state of the second VXLAN tunnel to an active state.

The sending unit 1004 is further configured to notify, through the second VXLAN tunnel, the third VTEP device of third state information carrying an active state, where the third state information is used to indicate the tunnel state of the second VXLAN tunnel.

The receiving unit is configured to receive, through the second VXLAN tunnel, third reply information for the third state information from the third VTEP device, where the third reply information is used to instruct the third VTEP device to update the tunnel state of the second VXLAN tunnel to an active state.

The packet forwarding unit 1006 is configured to forward the VXLAN packet through the second VXLAN tunnel in an active tunnel state.

Optionally, the receiving unit is configured to receive, through the first VXLAN tunnel, a link failure message from the second VTEP device, where the link failure message is used to indicate that a failure occurs in a link between the second VTEP device and an IP network, and the IP network is used to send traffic to a host connected to the first VTEP device and is used to receive traffic from the host connected to the first VTEP device.

The processing unit 1002 is further configured to set the tunnel state of the first VXLAN tunnel to an inactive state, and set the tunnel state of the second VXLAN tunnel to an active state.

The sending unit 1004 is further configured to notify, through the second VXLAN tunnel, the third VTEP device of third state information carrying an active state, where the third state information is used to indicate the tunnel state of the second VXLAN tunnel.

The receiving unit is further configured to receive, through the second VXLAN tunnel, third reply information for the third state information from the third VTEP device, where the third reply information is used to instruct the third VTEP device to update the tunnel state of the second VXLAN tunnel to an active state.

The packet forwarding unit 1006 is configured to forward the VXLAN packet through the second VXLAN tunnel in an active tunnel state.

Optionally, the receiving unit is further configured to receive an ARP request packet from the host, where the ARP request packet is used to request a MAC address of a VXLAN gateway.

The sending unit 1004 is further configured to send, respectively through the first VXLAN tunnel and the second VXLAN tunnel, the ARP request packet to the second VTEP device and the third VTEP device such that the second VTEP device and the third VTEP device generate ARP entries based on the ARP request packet.

Optionally, the processing unit 1002 is further configured to generate the ARP entry based on the ARP request packet.

A storage unit (not shown) is configured to store the ARP entry.

The processing unit 1002 is further configured to generate the ARP request packet based on the stored ARP entry, and the sending unit 1004 is further configured to send the ARP request packet to a destination VTEP device through the failure-recovered VXLAN tunnel when a failure of a failed VXLAN tunnel is recovered, or the processing unit 1002 is further configured to generate the ARP request packet based on the stored ARP entry, and the sending unit 1004 is further configured to send the ARP request packet to the destination VTEP device through the newly established VXLAN tunnel when a new VXLAN tunnel is established.

The first VTEP device 1000 shown in FIG. 8 may perform corresponding steps that are performed by the first VTEP device in the method of the foregoing embodiment. Therefore, the VXLAN tunnel in an active state is in a working state and forwards traffic, and the VXLAN tunnel in an inactive state is in a non-working state and does not forward traffic. A redundancy protection capability of a VXLAN network is improved using the method provided in this embodiment.

Figure 9:
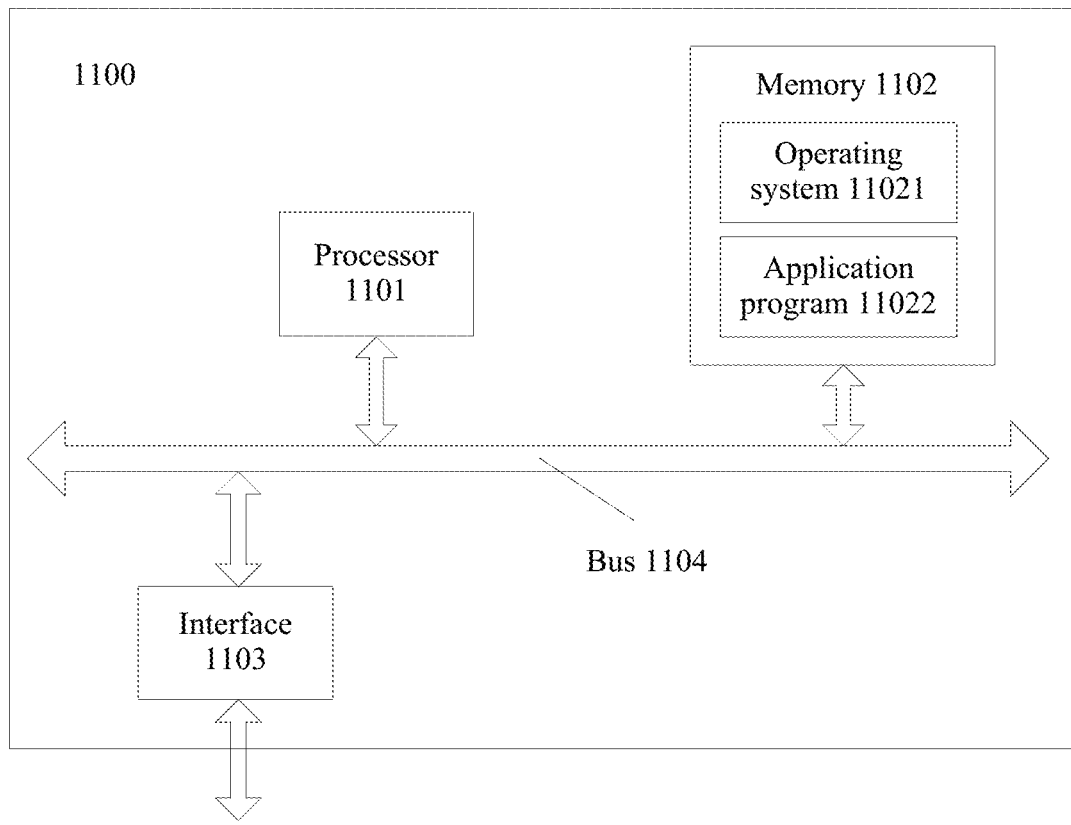
FIG. 9 is a schematic diagram of a hardware structure of a first VTEP device according to an embodiment of the present application.

FIG. 9 is a schematic diagram of a hardware structure of a first VTEP device 1100 according to an embodiment of the present application. The first VTEP device 1100 shown in FIG. 9 may perform corresponding steps that are performed by the first VTEP device in the method of the foregoing embodiment.

As shown in FIG. 9, the first VTEP device 1100 includes a processor 1101, a memory 1102, an interface 1103, and a bus 1104. The interface 1103 may be implemented in a wireless or wired manner, and further, may be implemented using an element such as a network adapter. The processor 1101, the memory 1102, and the interface 1103 described above are connected using the bus 1104.

The interface 1103 may further include a transmitter and a receiver (not shown), and is configured to send and receive information between the first VTEP device 1100 and the second VTEP device in the foregoing embodiment, or is configured to send and receive information between the first VTEP device 1100 and the third VTEP device in the foregoing embodiment. In addition, the interface 1103 may be further configured to send and receive information between the first VTEP device 1100 and a host connected to the first VTEP device 1100. As an example, the interface 1103 is configured to support processes in FIG. 2A-FIG. 2B to FIG. 4A-FIG. 4B of steps S103, S106, S110, S112, S113, S203, S207, S208, S212, S303, S305, S309, S310, and S314. The processor 1101 is configured to perform processing that is performed by the first VTEP device in the foregoing embodiment. As an example, the processor 1101 is configured to support processes in FIG. 2A-FIG. 2B to FIG. 4A-FIG. 4B of steps S101, S102, S201, S202, and S304. The memory 1102 includes an operating system 11021 and an application program 11022, and is configured to store a program, code, or an instruction. When executing the program, code, or the instruction, the processor 1101 or a hardware device may complete a processing processes related to the first VTEP device in FIG. 2A-FIG. 2B to FIG. 4A-FIG. 4B.

It may be understood that FIG. 9 merely shows a simplified design of the first VTEP device. In actual application, the first VTEP device may include any quantity of interfaces, processors, memories, and the like, and all first VTEP devices that can implement the present application fall within the protection scope of the present application.

In addition, an embodiment of the present application provides a computer storage medium configured to store a computer software instruction used by the foregoing first VTEP device, where the computer software instruction includes a program designed to perform the foregoing embodiments shown in FIG. 2A-FIG. 2B to FIG. 4A-FIG. 4B.

Figure 10:
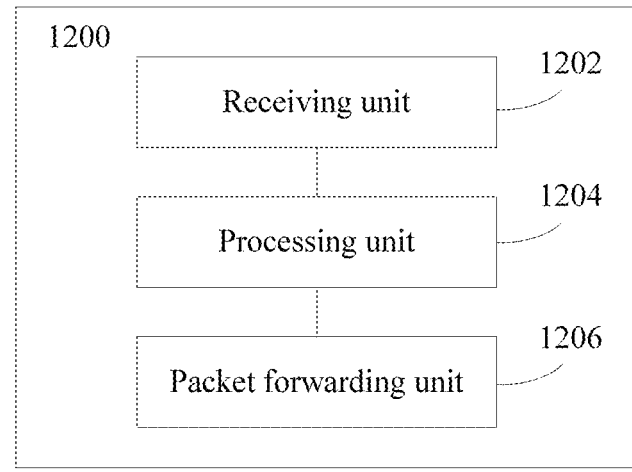
FIG. 10 is a schematic structural diagram of a second VTEP device according to an embodiment of the present application.

FIG. 10 is a schematic structural diagram of a second VTEP device 1200 according to an embodiment of the present application. The second VTEP device 1200 shown in FIG. 10 may perform corresponding steps that are performed by the second VTEP device in the method of the foregoing embodiment. As shown in FIG. 10, the second VTEP device 1200 includes a receiving unit 1202, a processing unit 1204, and a packet forwarding unit 1206.

The receiving unit 1202 is configured to receive, through a first VXLAN tunnel, first state information from a first VTEP device, where the first state information is used to indicate a tunnel state of the first VXLAN tunnel.

The processing unit 1204 is configured to confirm a tunnel state of the first VXLAN tunnel as an active state, and set a route priority at which an IP network reaches the second VTEP device 1200 to a first priority when the tunnel state carried in the first state information is an active state, where the IP network is used to send traffic to a host connected to the first VTEP device and is used to receive traffic from the host connected to the first VTEP device, the first priority is higher than the second priority, and the second priority is a route priority at which the IP network reaches the second VTEP device 1200 when the first VXLAN tunnel is in an inactive state.

The packet forwarding unit 1206 is configured to forward the VXLAN packet through the first VXLAN tunnel in an active tunnel state.

Optionally, the second VTEP device 1200 further includes a sending unit (not shown), where the sending unit is configured to send, through the first VXLAN tunnel, first reply information for the first state information to the first VTEP device, where the first reply information is used to instruct the second VTEP device 1200 to confirm a tunnel state of the first VXLAN tunnel.

Optionally, the processing unit 1204 is further configured to switch the tunnel state of the first VXLAN tunnel to an inactive state, and switch from the route priority at which the IP network reaches the second VTEP device to the second priority when a failure occurs in the first VXLAN tunnel in an active tunnel state.

Optionally, the processing unit 1204 is further configured to generate a link failure message, where the link failure message is used to indicate that the failure occurs in the link between the second VTEP device 1200 and the IP network when a failure occurs in a link between the second VTEP device 1200 and the IP network.

The sending unit is configured to send, through the first VXLAN tunnel in an active tunnel state, the link failure message to the first VTEP device.

The receiving unit 1202 is further configured to receive, through the first VXLAN tunnel, second state information from the first VTEP device, where the second state information carries an inactive state, and is used to indicate the tunnel state of the first VXLAN tunnel.

The processing unit 1204 is further configured to switch, based on the second state information, the tunnel state of the first VXLAN tunnel to an inactive state, and switch from the route priority at which the IP network reaches the second VTEP device 1200 to the second priority.

The second VTEP device 1200 shown in FIG. 10 may perform corresponding steps that are performed by the second VTEP device in the method of the foregoing embodiment. The method provided in this embodiment can improve a redundancy protection capability of a VXLAN network, and ensure that an uplink traffic direction is consistent with a downlink traffic direction.

Figure 11:
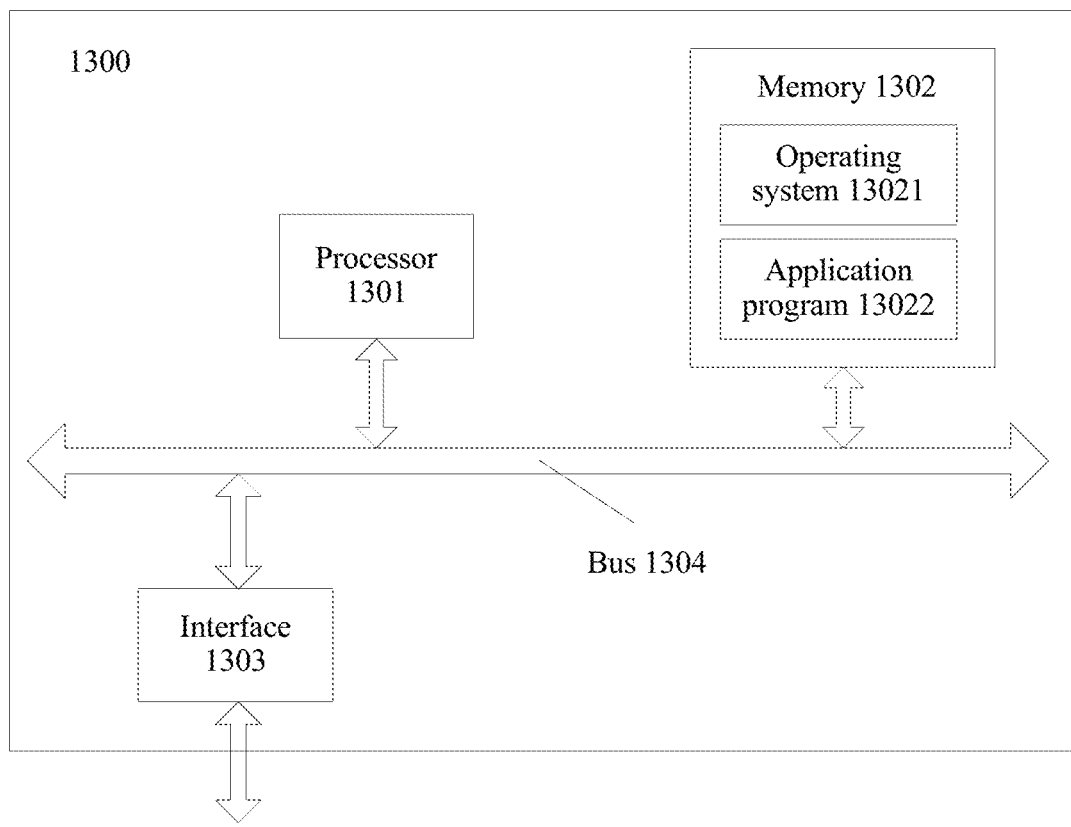
FIG. 11 is a schematic diagram of a hardware structure of a second VTEP device according to an embodiment of the present application.

FIG. 11 is a schematic diagram of a hardware structure of a second VTEP device 1300 according to an embodiment of the present application. The second VTEP device 1300 shown in FIG. 11 may perform corresponding steps that are performed by the second VTEP device in the method of the foregoing embodiment.

As shown in FIG. 11, the second VTEP device 1300 includes a processor 1301, a memory 1302, an interface 1303, and a bus 1304. The interface 1303 may be implemented in a wireless or wired manner, and further, may be implemented using an element such as a network adapter. The processor 1301, the memory 1302, and the interface 1303 described above are connected using the bus 1304.

The interface 1303 may include a transmitter and a receiver, and is configured to send and receive information between the second VTEP device and the first VTEP device in the foregoing embodiment, or is configured to send and receive information between the second VTEP device and the IP network in the foregoing embodiment. As an example, the interface 1303 is configured to support processes in FIG. 2A-FIG. 2B to FIG. 4A-FIG. 4B of steps S104, S109, S113, S211, S213, S214, S302, S311, and S313. The processor 1301 is configured to perform processing that is performed by the second VTEP device in the foregoing embodiment. As an example, the processor 1301 is configured to support processes in FIG. 2A-FIG. 2B to FIG. 4A-FIG. 4B of steps S105, S209, S210, S301, and S312. The memory 1302 includes an operating system 13021 and an application program 13022, and is configured to store a program, code, or an instruction. When executing the program, code, or the instruction, the processor 1301 or a hardware device may complete a processing processes related to the second VTEP device in FIG. 2A-FIG. 2B to FIG. 4A-FIG. 4B.

It may be understood that FIG. 11 merely shows a simplified design of the second VTEP device 1300. In actual application, the second VTEP device 1300 may include any quantity of interfaces, processors, memories, and the like, and all second VTEP devices that can implement the present application fall within the protection scope of the present application.

In addition, an embodiment of the present application provides a computer storage medium configured to store a computer software instruction used by the foregoing second VTEP device, where the computer software instruction includes a program designed to perform the foregoing embodiments shown in FIG. 2A-FIG. 2B to FIG. 4A-FIG. 4B.

The methods or algorithm steps described with reference to the content disclosed in the present application may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programable ROM (EPROM) memory, an electrically EPROM (EEPROM), a register, a hard disk, a removable hard disk, a compact disc ROM (CD-ROM), or a storage medium in any other forms well-known in the art. A storage medium used as an example is coupled to the processor such that the processor can read information from the storage medium, and can write information into the storage medium. Certainly, the storage medium may be a part of the processor. The processor and the storage medium may be located in an application specific integrated circuit (ASIC). In addition, the ASIC may be located in the user equipment. Certainly, the processor and the storage medium may exist in the user equipment as discrete components.

A person of skill in the art should be aware that in one or more of the foregoing examples, the functions described in the present application may be implemented using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefit effects of the present application are further described in detail in the foregoing specific implementations. It should be understood that the foregoing descriptions are merely specific implementations of the present application, but are not intended to limit the protection scope of the present application. Any modification, equivalent replacement, or improvement made based on the technical solutions of the present application shall fall within the protection scope of the present application.

What is claimed is:

1. A virtual extensible local area network (VXLAN) packet forwarding method, comprising:
    setting, by a first VXLAN tunnel end point (VTEP) device and based on a priority of a first VXLAN tunnel, a tunnel state of the first VXLAN tunnel to an active state, the first VXLAN tunnel being a VXLAN tunnel between the first VTEP device and a second VTEP device;
    setting, by the first VTEP device and based on a priority of a second VXLAN tunnel, a tunnel state of the second VXLAN tunnel to an inactive state, the second VXLAN tunnel being a VXLAN tunnel between the first VTEP device and a third VTEP device, the priority of the first VXLAN tunnel being higher than the priority of the second VXLAN tunnel, and an Internet Protocol (IP) address of the second VTEP device being different from an IP address of the third VTEP device;
    notifying, by the first VTEP device and through the first VXLAN tunnel, the second VTEP device of first state information carrying the active state, the first state information indicating the tunnel state of the first VXLAN tunnel;
    notifying, by the first VTEP device and through the second VXLAN tunnel, the third VTEP device of second state information carrying the inactive state, the second state information indicating the tunnel state of the second VXLAN tunnel; and
    forwarding, by the first VTEP device, a VXLAN packet through the first VXLAN tunnel in the active state.

2. The method of claim 1, wherein before forwarding the VXLAN packet through the first VXLAN tunnel in the active state, the method further comprises:
    receiving, by the first VTEP device and through the first VXLAN tunnel, first reply information for the first state information from the second VTEP device, the first reply information instructing the second VTEP device to confirm the tunnel state of the first VXLAN tunnel as the active state; and
    receiving, by the first VTEP device and through the second VXLAN tunnel, second reply information for the second state information from the third VTEP device, the second reply information instructing the third VTEP device to confirm the tunnel state of the second VXLAN tunnel as the inactive state.

3. The method of claim 1, wherein after forwarding the VXLAN packet through the first VXLAN tunnel in the active state, the method further comprises:

setting, by the first VTEP device, the tunnel state of the first VXLAN tunnel to the inactive state and the tunnel state of the second VXLAN tunnel to the active state when the first VTEP device determines that a failure occurs in the first VXLAN tunnel;

notifying, by the first VTEP device and through the second VXLAN tunnel, the third VTEP device of third state information carrying the active state, the third state information indicating the tunnel state of the second VXLAN tunnel;

receiving, by the first VTEP device and through the second VXLAN tunnel, third reply information for the third state information from the third VTEP device, the third reply information instructing the third VTEP device to update the tunnel state of the second VXLAN tunnel to the active state; and forwarding, by the first VTEP device, the VXLAN packet through the second VXLAN tunnel in the active state.

4. The method of claim 1, wherein after forwarding the VXLAN packet through the first VXLAN tunnel in the active state, the method further comprises:

receiving, by the first VTEP device and through the first VXLAN tunnel, a link failure message from the second VTEP device, the link failure message indicating that a failure occurs in a link between the second VTEP device and an IP network, and the IP network sending traffic to a host coupled to the first VTEP device and receiving traffic from the host coupled to the first VTEP device;

setting, by the first VTEP device, the tunnel state of the first VXLAN tunnel to the inactive state and the tunnel state of the second VXLAN tunnel to the active state;

notifying, by the first VTEP device and through the second VXLAN tunnel, the third VTEP device of third state information carrying the active state, the third state information indicating the tunnel state of the second VXLAN tunnel;

receiving, by the first VTEP device and through the second VXLAN tunnel, third reply information for the third state information from the third VTEP device, the third reply information instructing the third VTEP device to update the tunnel state of the second VXLAN tunnel to the active state; and forwarding, by the first VTEP device, the VXLAN packet through the second VXLAN tunnel in the active state.

5. The method of claim 1, further comprising:

receiving, by the first VTEP device, an Address Resolution Protocol (ARP) request packet from a host, the ARP request packet requesting a Media Access Control (MAC) address of a VXLAN gateway; and sending, by the first VTEP device and respectively through the first VXLAN tunnel and the second VXLAN tunnel, the ARP request packet to the second VTEP device and the third VTEP device to enable the second VTEP device and the third VTEP device to generate ARP entries based on the ARP request packet.

6. The method of claim 5, further comprising:

generating, by the first VTEP device, an ARP entry based on the ARP request packet;

storing, by the first VTEP device, the ARP entry;

sending the ARP request packet to a destination VTEP device through a failure-recovered VXLAN tunnel when the first VTEP device determines that a failure of the failure-recovered VXLAN tunnel is recovered; and sending the ARP request packet to the destination VTEP device through a new VXLAN tunnel when the first VTEP device determines that the new VXLAN tunnel is established.

7. A first virtual extensible local area network (VXLAN) tunnel end point (VTEP) device, comprising:

a non-transitory memory storing instructions; and a processor coupled to the non-transitory memory, the instructions, when executed by the processor, causing the first VTEP device to be configured to:

set, based on a priority of a first VXLAN tunnel, a tunnel state of the first VXLAN tunnel to an active state, the first VXLAN tunnel being a VXLAN tunnel between the first VTEP device and a second VTEP device;

set, based on a priority of a second VXLAN tunnel, a tunnel state of the second VXLAN tunnel to an inactive state, the second VXLAN tunnel being a VXLAN tunnel between the first VTEP device and a third VTEP device, the priority of the first VXLAN tunnel being higher than the priority of the second VXLAN tunnel, and an Internet Protocol (IP) address of the second VTEP device being different from an IP address of the third VTEP device;

notify, through the first VXLAN tunnel, the second VTEP device of first state information carrying the active state, the first state information indicating the tunnel state of the first VXLAN tunnel;

notify, through the second VXLAN tunnel, the third VTEP device of second state information carrying the inactive state, the second state information indicating the tunnel state of the second VXLAN tunnel; and forward a VXLAN packet through the first VXLAN tunnel in the active state.

8. The first VTEP device of claim 7, wherein before forwarding the VXLAN packet through the first VXLAN tunnel in the active state, the instructions, when executed by the processor, further cause the first VTEP device to be configured to:

receive, through the first VXLAN tunnel, first reply information for the first state information from the second VTEP device, the first reply information instructing the second VTEP device to confirm the tunnel state of the first VXLAN tunnel as the active state; and receive, through the second VXLAN tunnel, second reply information for the second state information from the third VTEP device, the second reply information instructing the third VTEP device to confirm the tunnel state of the second VXLAN tunnel as the inactive state.

9. The first VTEP device of claim 7, wherein the instructions, when executed by the processor, further cause the first VTEP device to be configured to:

set the tunnel state of the first VXLAN tunnel to the inactive state and the tunnel state of the second VXLAN tunnel to the active state when the first VTEP device determines that a failure occurs in the first VXLAN tunnel;

notify, through the second VXLAN tunnel, the third VTEP device of third state information carrying the active state, the third state information indicating the tunnel state of the second VXLAN tunnel;

receive, through the second VXLAN tunnel, third reply information for the third state information from the third VTEP device, the third reply information instructing the third VTEP device to update the tunnel state of the second VXLAN tunnel to the active state; and forward the VXLAN packet through the second VXLAN tunnel in the active state.

10. The first VTEP device of claim 7, wherein the instructions, when executed by the processor, further cause the first VTEP device to be configured to:

receive, through the first VXLAN tunnel, a link failure message from the second VTEP device, the link failure message indicating that a failure occurs in a link between the second VTEP device and an IP network, and the IP network sending traffic to a host coupled to the first VTEP device and receiving traffic from the host coupled to the first VTEP device;

set the tunnel state of the first VXLAN tunnel to the inactive state and the tunnel state of the second VXLAN tunnel to the active state;

notify, through the second VXLAN tunnel, the third VTEP device of third state information carrying the active state, the third state information indicating the tunnel state of the second VXLAN tunnel;

receive, through the second VXLAN tunnel, third reply information for the third state information from the third VTEP device, the third reply information instructing the third VTEP device to update the tunnel state of the second VXLAN tunnel to the active state; and forward the VXLAN packet through the second VXLAN tunnel in the active state.

11. The first VTEP device of claim 7, wherein the instructions, when executed by the processor, further cause the first VTEP device to be configured to:

receive an Address Resolution Protocol (ARP) request packet from a host, the ARP request packet requesting a Media Access Control (MAC) address of a VXLAN gateway; and send, respectively through the first VXLAN tunnel and the second VXLAN tunnel, the ARP request packet to the second VTEP device and the third VTEP device to enable the second VTEP device and the third VTEP device to generate ARP entries based on the ARP request packet.

12. The first VTEP device of claim 11, wherein the instructions, when executed by the processor, further cause the first VTEP device to be configured to:

generate an ARP entry based on the ARP request packet;
store the ARP entry;
send the ARP request packet to a destination VTEP device through a failure-recovered VXLAN tunnel when a failure of the failure-recovered VXLAN tunnel is recovered; and
send the ARP request packet to the destination VTEP device through a new VXLAN tunnel when the new VXLAN tunnel is established.

13. A computer program product comprising computer-executable instructions embodied on a non-transitory computer-readable medium that, when executed by a processor, cause first virtual extensible local area network (VXLAN) tunnel end point (VTEP) device to:

set, based on a priority of a first VXLAN tunnel, a tunnel state of the first VXLAN tunnel to an active state, the first VXLAN tunnel being a VXLAN tunnel between the first VTEP device and a second VTEP device;

set, based on a priority of a second VXLAN tunnel, a tunnel state of the second VXLAN tunnel to an inactive state, the second VXLAN tunnel being a VXLAN tunnel between the first VTEP device and a third VTEP device, the priority of the first VXLAN tunnel being higher than the priority of the second VXLAN tunnel, and an Internet Protocol (IP) address of the second VTEP device being different from an IP address of the third VTEP device;

notify, through the first VXLAN tunnel, the second VTEP device of first state information carrying the active state, the first state information indicating the tunnel state of the first VXLAN tunnel;

notify, through the second VXLAN tunnel, the third VTEP device of second state information carrying the inactive state, the second state information indicating the tunnel state of the second VXLAN tunnel; and forward a VXLAN packet through the first VXLAN tunnel in the active state.

14. The computer program product of claim 13, wherein the instructions further cause the first VTEP device to:

receive, through the first VXLAN tunnel, first reply information for the first state information from the second VTEP device, the first reply information instructing the second VTEP device to confirm the tunnel state of the first VXLAN tunnel as the active state; and receive, through the second VXLAN tunnel, second reply information for the second state information from the third VTEP device, the second reply information instructing the third VTEP device to confirm the tunnel state of the second VXLAN tunnel as the inactive state.

15. The computer program product of claim 13, wherein the instructions further cause the first VTEP device to:

set the tunnel state of the first VXLAN tunnel to the inactive state and the tunnel state of the second VXLAN tunnel to the active state when the first VTEP device determines that a failure occurs in the first VXLAN tunnel;

notify, through the second VXLAN tunnel, the third VTEP device of third state information carrying the active state, the third state information indicating the tunnel state of the second VXLAN tunnel;

receive, through the second VXLAN tunnel, third reply information for the third state information from the third VTEP device, the third reply information instructing the third VTEP device to update the tunnel state of the second VXLAN tunnel to the active state; and forward the VXLAN packet through the second VXLAN tunnel in the active state.

16. The computer program product of claim 13, wherein the instructions further cause the first VTEP device to:

receive, through the first VXLAN tunnel, a link failure message from the second VTEP device, the link failure message indicating that a failure occurs in a link between the second VTEP device and an IP network, and the IP network sending traffic to a host coupled to the first VTEP device and receiving traffic from the host coupled to the first VTEP device;

set the tunnel state of the first VXLAN tunnel to the inactive state and the tunnel state of the second VXLAN tunnel to the active state;

notify, through the second VXLAN tunnel, the third VTEP device of third state information carrying the active state, the third state information indicating the tunnel state of the second VXLAN tunnel;

receive, through the second VXLAN tunnel, third reply information for the third state information from the third VTEP device, the third reply information instructing the third VTEP device to update the tunnel state of the second VXLAN tunnel to the active state; and forward the VXLAN packet through the second VXLAN tunnel in the active state.

17. The computer program product of claim 13, wherein the instructions further cause the first VTEP device to:
receive an Address Resolution Protocol (ARP) request packet from a host, the ARP request packet requesting a Media Access Control (MAC) address of a VXLAN gateway; and
send, respectively through the first VXLAN tunnel and the second VXLAN tunnel, the ARP request packet to the second VTEP device and the third VTEP device to enable the second VTEP device and the third VTEP device to generate ARP entries based on the ARP request packet.

18. The computer program product of claim 13, wherein the instructions further cause the first VTEP device to:
generate an ARP entry based on the ARP request packet;
store the ARP entry;
send the second ARP request packet to a destination VTEP device through a failure-recovered VXLAN tunnel when a failure of the failure-recovered VXLAN tunnel is recovered; and
send the third ARP request packet to the destination VTEP device through a new VXLAN tunnel when the new VXLAN tunnel is established.

\* \* \* \* \*